(12) United States Patent
Kikuta et al.

(10) Patent No.: US 9,330,347 B2
(45) Date of Patent: May 3, 2016

(54) METHOD FOR CREATING DOT ARRANGEMENTS OR THRESHOLD MATRICES, AN IMAGE PROCESSING APPARATUS, AND A STORAGE MEDIUM

(71) Applicant: CANON KABUSHIKI KAISHA, Tokyo (JP)

(72) Inventors: Kyohei Kikuta, Tokyo (JP); Hideki Kadoi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/677,646

(22) Filed: Apr. 2, 2015

(65) Prior Publication Data

US 2015/0286905 A1 Oct. 8, 2015

(30) Foreign Application Priority Data

Apr. 4, 2014 (JP) ................... 2014-077884

(51) Int. Cl.
*H04N 1/46* (2006.01)
*H04N 1/60* (2006.01)
*G06K 15/10* (2006.01)
*G06K 15/02* (2006.01)
*H04N 1/40* (2006.01)

(52) U.S. Cl.
CPC .......... *G06K 15/105* (2013.01); *G06K 15/1868* (2013.01); *G06K 15/1881* (2013.01); *H04N 1/40* (2013.01)

(58) Field of Classification Search
None
See application file for complete search history.

(56) References Cited

U.S. PATENT DOCUMENTS

| | | | | |
|---|---|---|---|---|
| 5,696,602 A | * | 12/1997 | Cooper | H04N 1/4051 358/3.18 |
| 5,821,913 A | * | 10/1998 | Mamiya | G09G 3/3611 345/671 |
| 6,020,978 A | * | 2/2000 | Cooper | H04N 1/4051 358/1.9 |
| 6,320,676 B1 | * | 11/2001 | Yoshidome | G06T 5/20 358/1.9 |
| 6,356,363 B1 | * | 3/2002 | Cooper | G06K 15/00 358/1.8 |
| 6,724,499 B1 | * | 4/2004 | Satoh | G06K 15/02 358/1.9 |
| 6,862,111 B2 | * | 3/2005 | Lin | H04N 1/52 345/597 |
| 6,995,863 B1 | * | 2/2006 | Miguel | G06K 15/02 358/1.8 |
| 7,025,515 B2 | * | 4/2006 | Woods | H04N 1/4105 358/3.01 |
| 7,623,267 B2 | * | 11/2009 | Yamazaki | H04N 1/405 345/616 |
| 7,701,614 B2 | * | 4/2010 | Yamazaki | H04N 1/52 345/616 |

(Continued)

FOREIGN PATENT DOCUMENTS

JP 2008188805 A 8/2008
JP 2010274656 A 12/2010

*Primary Examiner* — Madelein Nguyen
(74) *Attorney, Agent, or Firm* — Rossi, Kimms & McDowell LLP

(57) ABSTRACT

An image that is robust against position shift and that has improved graininess is formed. In the embodiments, a halftone processor creates a first dot arrangement and a second dot arrangement from related weighting functions and weighting maps (S1508, S1509), evaluates the image quality when the first dot arrangement and the second dot arrangement are overlapped and combined (S1511, S1512), updates the weightings for only pixels where a dot is arranged in case where the evaluation results in the evaluating step are not within a specified range (S1513), obtains a first dot arrangement and a second dot arrangement that were recreated based on the updated weightings (S1508, S1509), and repeats steps S1508 to S1514 until it is determined that the change in image quality due to position shift when the recreated first and second dot arrangements are overlapped and combined is within a specified range.

9 Claims, 37 Drawing Sheets

(56) References Cited

U.S. PATENT DOCUMENTS

| | | | | |
|---|---|---|---|---|
| 7,961,350 B2* | 6/2011 | Kakutani | ............. | H04N 1/4051 358/1.8 |
| 7,961,355 B2* | 6/2011 | Kakutani | ................. | H04N 1/52 358/1.8 |
| 8,384,959 B2* | 2/2013 | Asai | ..................... | H04N 1/4051 345/596 |
| 8,681,381 B1* | 3/2014 | Keithley | ................ | H04N 1/405 358/1.9 |
| 8,705,131 B2* | 4/2014 | Woods | ................. | H04N 1/4055 358/1.9 |
| 8,767,261 B2* | 7/2014 | Kakutani | ............. | H04N 1/4051 358/1.9 |
| 2002/0051233 A1* | 5/2002 | Morimatsu | .......... | H04N 1/4053 358/3.03 |
| 2002/0163528 A1* | 11/2002 | Cooper | ................ | H04N 1/4055 345/596 |
| 2003/0210210 A1* | 11/2003 | Ide | ....................... | G02B 6/0043 345/30 |
| 2004/0165054 A1* | 8/2004 | Saquib | .................... | B41J 2/355 347/211 |
| 2005/0151752 A1* | 7/2005 | Phan | .................... | G09G 3/2003 345/589 |
| 2005/0220523 A1* | 10/2005 | Fujimori | ................ | B41J 19/142 400/76 |
| 2006/0214971 A1* | 9/2006 | Yamazaki | .............. | G06K 15/02 347/15 |
| 2007/0058204 A1* | 3/2007 | Kakutani | ............. | H04N 1/4051 358/3.13 |
| 2008/0192298 A1* | 8/2008 | Asai | ..................... | H04N 1/4051 358/3.13 |
| 2008/0316554 A1* | 12/2008 | Yanai | .................... | G06K 15/107 358/534 |
| 2009/0097073 A1* | 4/2009 | Kawamura | ............ | H04N 1/405 358/3.06 |
| 2009/0257093 A1* | 10/2009 | Kawabe | ............. | H04N 1/40075 358/3.06 |
| 2011/0116136 A1* | 5/2011 | Tamura | .............. | H04N 1/40037 358/3.06 |
| 2011/0279493 A1* | 11/2011 | Phan | ....................... | H04N 9/30 345/694 |
| 2012/0154469 A1* | 6/2012 | Komamiya | ............ | B41J 19/147 347/14 |
| 2012/0188582 A1* | 7/2012 | Yamaguchi | .......... | H04N 1/4053 358/1.14 |
| 2012/0287193 A1* | 11/2012 | Suzuki | .................... | B41J 2/2125 347/15 |
| 2014/0293298 A1* | 10/2014 | Takahama | ............ | G06K 15/102 358/1.8 |
| 2015/0092241 A1* | 4/2015 | Hori | ................... | G06K 15/1881 358/2.1 |

* cited by examiner

DIFFERENT SET OF OVERLAPPING COMBINATION OF DOT ARRANGEMENTS

| FIG.15A |
| FIG.15B |

FIG.18A  APEX = 0.98  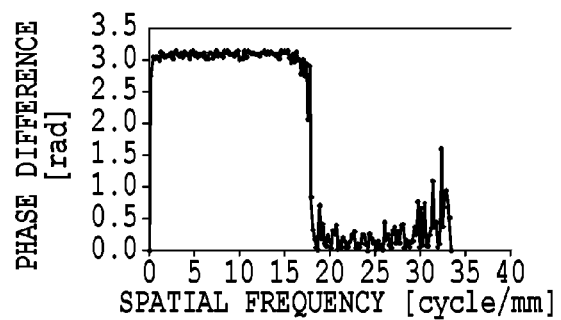
FIG.18B  APEX = 0.99  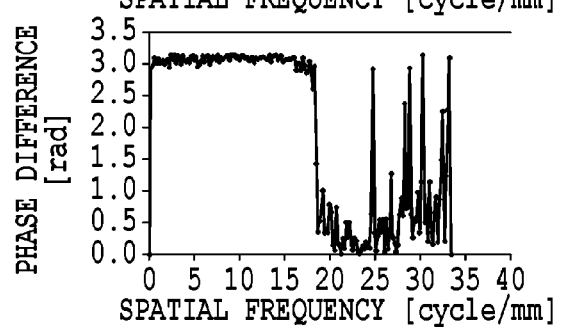
FIG.18C  APEX = 1.00  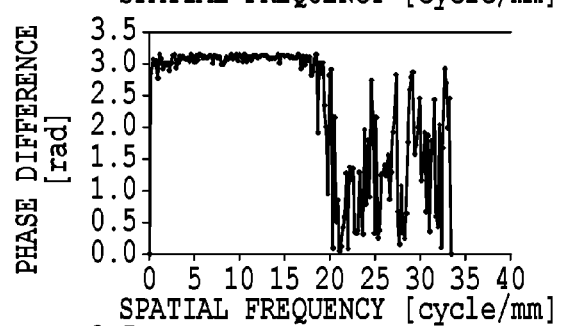
FIG.18D  APEX = 1.01  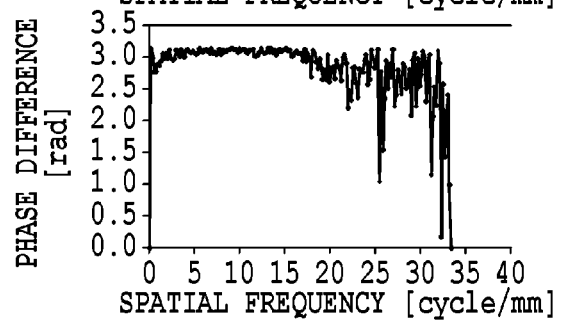
FIG.18E  APEX = 1.02  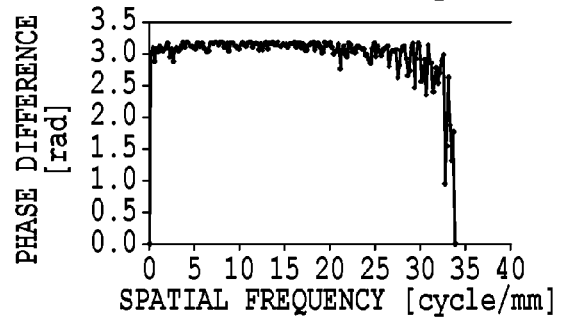

OVERLAPPING COMBINATION OF DOT ARRANGEMENTS OF EMBODIMENT 1

2001    2002    2003    2004

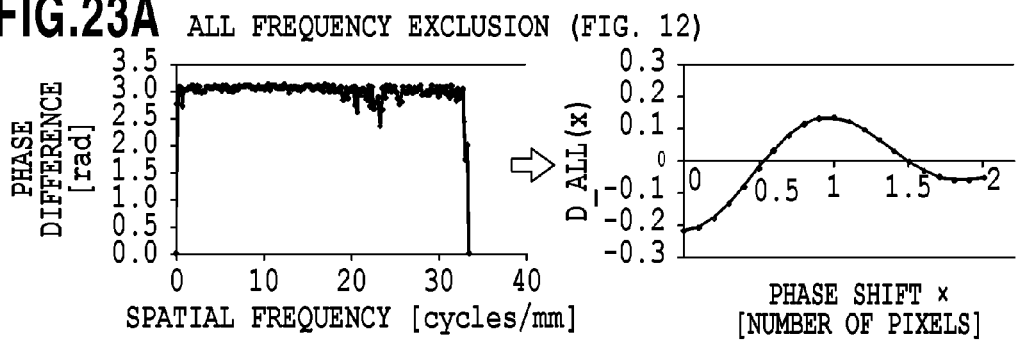
FIG. 23A ALL FREQUENCY EXCLUSION (FIG. 12)
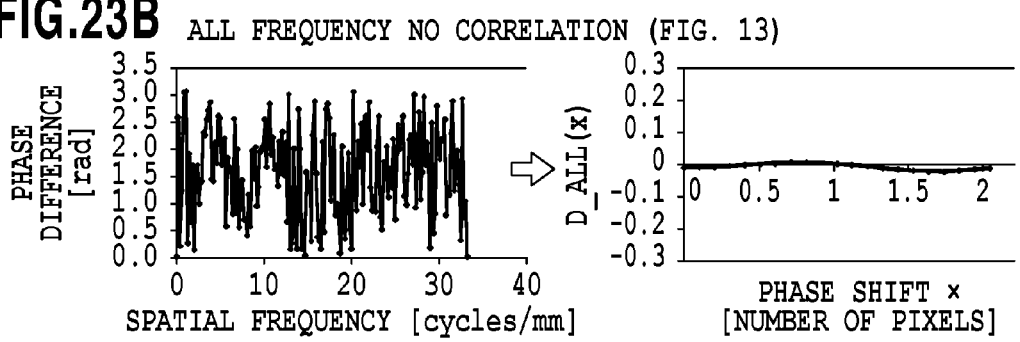
FIG. 23B ALL FREQUENCY NO CORRELATION (FIG. 13)
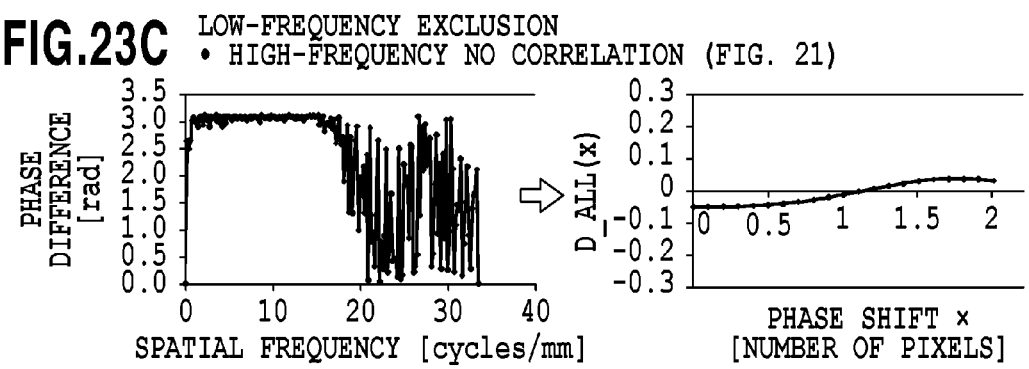
FIG. 23C LOW-FREQUENCY EXCLUSION
• HIGH-FREQUENCY NO CORRELATION (FIG. 21)
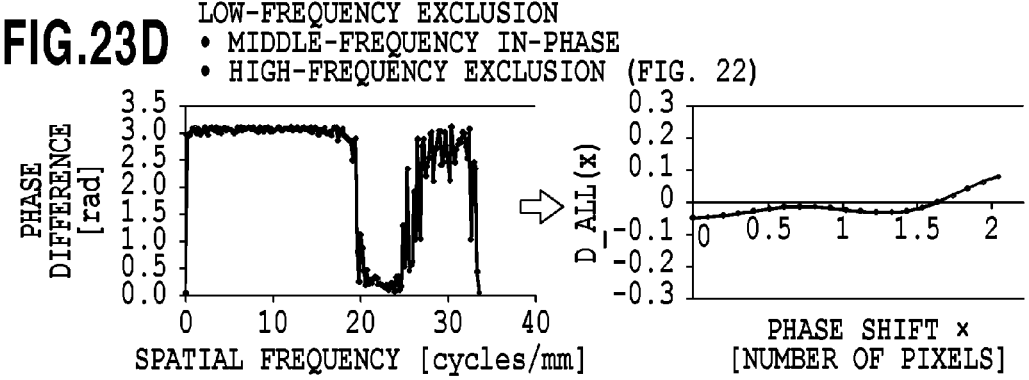
FIG. 23D LOW-FREQUENCY EXCLUSION
• MIDDLE-FREQUENCY IN-PHASE
• HIGH-FREQUENCY EXCLUSION (FIG. 22)

PRINTING NOZZLE ARRAY K1
PRINTING NOZZLE ARRAY K2
↓ CONVEYANCE DIRECTION OF PAPER
FIG.26A
EJECTION POSITION OF PRINTING NOZZLE ARRAY K1
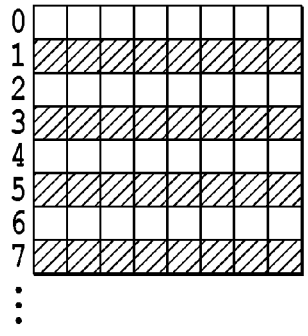
FIG.26B
EJECTION POSITION OF PRINTING NOZZLE ARRAY K2
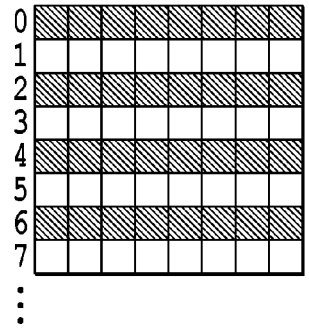
FIG.26C
DOT PATTERN
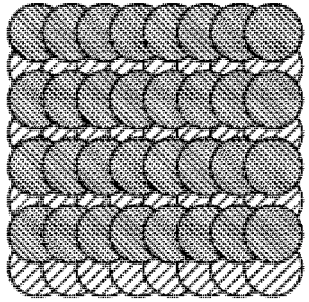
FIG.26D

SMALL DOTS

MIDDLE-SIZED DOTS

LARGE DOTS

METHOD FOR CREATING DOT ARRANGEMENTS OR THRESHOLD MATRICES, AN IMAGE PROCESSING APPARATUS, AND A STORAGE MEDIUM

BACKGROUND OF THE INVENTION

1. Field of the Invention

The present invention relates to method for creating dot arrangements or threshold matrices, an image processing apparatus, and a recording medium, and more particularly to a method for creating dot arrangements or threshold matrices that are used in processing when forming an image by an image processing apparatus, an image processing apparatus that uses that method, and a storage medium.

2. Description of the Related Art

Image formation apparatuses that form images using dots on a recording medium are often used as apparatuses that output images that were processed by a personal computer or images that were taken by a digital camera or the like. Of such image formation apparatuses, a method of forming images on a recording medium by causing a recording material to adhere to the recording medium is widely used, and as a representative example, an inkjet recording method is known. In order to improve the recording speed and increase the image quality, an image formation apparatus that employs the inkjet recording method comprises a nozzle group in which plural ink ejection openings (nozzles) that are capable of ejecting ink of the same color and same density are collectively arranged. Furthermore, in order to improve the image quality, a nozzle group that is capable of ejecting ink having the same color but different density, or a nozzle group that is capable of discharging ink of the same color and same density by changing the amount of ink discharged in stages may also be provided.

This kind of image formation apparatus forms a final image by different nozzle groups printing plural times in the same main scanning printing area of a specified recording medium. When doing this, it is known that the image quality of the image that is finally formed is affected by the differences in the overlapping images by each of the nozzle groups (in other words dot arrangements of the ink). In an actual image formation apparatus it is difficult to eliminate the change in physical registration such as the conveyance amount of the recording medium or the position displacement of nozzles, so shifting of the impact position of the ink from each nozzle groups with respect to the target position cannot be avoided. Shifting in the impact position of the ink from each of the nozzle groups becomes the cause of lightness fluctuation in which the density of the image formed changes due to whether or not there is shifting of the impact position, uneven density, poor image quality due to graininess and the like. Therefore, this leads to the intended image not being formed when the nozzle group overlaps printing plural times.

In regard to this, technology is disclosed that reduces degradation of the formed image by using a dot arrangement for the dot arrangement of the ink formed by each of the nozzle groups that is not easily affected even when there is shifting of the impact position (in other words, a dot arrangement that is robust against a shift in position). Japanese Patent Laid-Open No. 2010-274656 discloses, for example, technology for creating a threshold matrix so that the threshold matrix that sets the dot arrangement of the nozzle groups creates dot arrangements having high dispersion. Japanese Patent Laid-Open No. 2008-188805 discloses technology, for example, that determines a dot arrangement so that the phase difference of the dot arrangements of each nozzle group satisfies a low-frequency reverse phase frequency characteristic.

However, the technology that is disclosed in Japanese Patent Laid-Open No. 2010-274656 does not take into consideration shifting in the sub-scanning direction (conveyance direction of the recording medium). Moreover, even when there is high dispersion of the dot arrangements that are made by the nozzle groups, the dots of the image that is finally formed is not necessarily robust against position shift. Furthermore, the technology that is disclosed in Japanese Patent Laid-Open No. 2008-188805 uses the concept that a low-frequency reverse phase characteristic will more widely cover the robustness against position shift, however, the control in high-frequency areas is insufficient, and there is a possibility that there will be no improvement in graininess.

SUMMARY OF THE INVENTION

The object of the present invention is to provide a method for creating dot arrangements or threshold matrices that are capable of improving graininess and robustness against shift in the ink impact position by taking into consideration not only the characteristics of low-frequency areas but also those of high-frequency areas.

The present invention provides a method for creating dot arrangements comprising the steps of: creating, based on weighting functions for giving weighting to a pixel where a dot is a arranged and to pixels surrounding that dot, a first dot arrangement and a second dot arrangement while referencing a first weighting map that corresponds to the first dot arrangement and a second weighting map that corresponds to the second dot arrangement; evaluating change in image quality of the dot pattern that is obtained by overlapping the first dot arrangement and the second dot arrangement in case where the first dot arrangement and the second dot arrangement have a position shift; updating the weightings for only pixels where a dot is arranged in case where the evaluation results in the evaluating step are not within a specified range; recreating, based on the updated weightings, the first weighting map and the second weighting map.

By applying the method for creating dot arrangements or threshold matrices according to the present invention to nozzle groups of an image formation apparatus, it is possible to form an image that is robust against shifting of the impact position of ink, and that has improved graininess.

Further features of the present invention will become apparent from the following description of exemplary embodiments (with reference to the attached drawings).

BRIEF DESCRIPTION OF THE DRAWINGS

FIGS. 18A to 18E are drawings illustrating the relationship between the height of the unit potential peak and the phase difference characteristic in an embodiment;

FIGS. 23A to 23D are drawings that explain how the change in the dot overlap differs due to the phase difference characteristic;

FIGS. 26A to 26D are drawings that schematically express the plural printing heads of a seventh embodiment, and the ejection position of dots;

DESCRIPTION OF THE EMBODIMENTS

First Embodiment

Hereafter, preferred embodiments of the present invention will be explained with reference to the accompanying drawings. The configuration illustrated in the following embodiments are just examples of the invention, and the present invention is not limited by that configuration, and can be embodiment without deviating from the range disclosed in the Claims.

Configuration of an Image Processing Apparatus/Image Formation Apparatus

Figure 1:
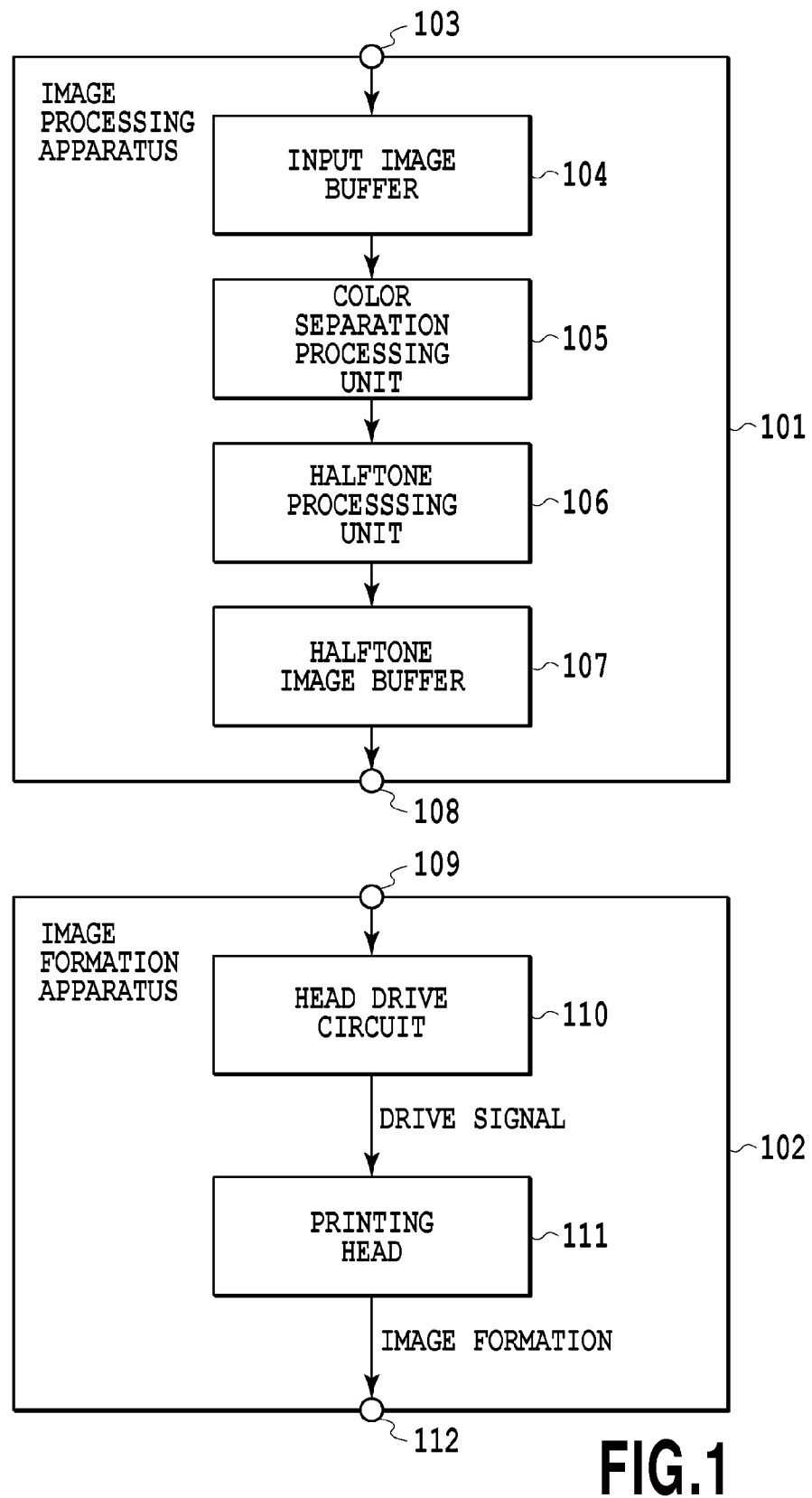
FIG. 1 is a block diagram illustrating the configuration of an image processing apparatus and image formation apparatus of an embodiment.

FIG. 1 is a block diagram illustrating the configuration of an image processing apparatus and image formation apparatus of an embodiment.

In FIG. 1, an image processing apparatus 101 and image formation apparatus 102 are connected by an interface or circuit. The image processing apparatus 101 is embodied, for example, as a personal computer in which a typical printer driver is installed. In that case, processing by the components of the image processing apparatus 101 explained below is achieved by a computer executing a specified program. The image formation apparatus 102 can also be constructed so as to include the image processing apparatus 101.

The image processing apparatus 101 stores color image data (hereafter referred to as color input image data) for the output target colors that were inputted from an input terminal 103 in an input image buffer 104. The color input image data comprises three color components: red (R), green (G) and blue (B). A color separation processing unit 105 separates the input image data to the image data that corresponds to color materials comprised in the image formation 102. A color separation processing unit 105 references a color separation lookup table (not illustrated in the figure) when performing color separation. In this embodiment, an example for a single color black (K) will be explained. When forming a color image, the image processing apparatus 101 performs a color separation process for plural colors such as cyan (C), magenta (M), yellow (Y) and black (K). In this embodiment, the color separation data is handled as 8-bit data that expresses 256 tone levels from 0 to 255, however, the data could also be converted to data having more tone levels than this. A halftone processing unit 106 receives the color separated data from the color separation processing unit 105, and processes the received color separated data to create halftone image data. In this process, the halftone processing unit 106 uses plural threshold matrices and performs a conversion (halftone) process to the number of tone levels that can be expressed by the image formation apparatus 102, and performs a setting process for setting a dot arrangement to be formed by the nozzle groups. The image processing apparatus 101 of this embodiment comprises two nozzle groups, and the halftone processing unit 106 converts the 8-bit color separated data to binary (1 bit) data for each of the nozzle groups. This will be explained in detail below. In the case of a color image, the halftone processing unit 106 performs processing for each individual color using plural threshold matrices that were prepared for each color. The halftone image data that was created by the halftone processing unit 106 is stored in a halftone image buffer 107. The halftone image data that is stored in the halftone image buffer 107 is outputted to the image formation apparatus 102 via an output terminal 108.

The image formation apparatus 102 forms an image on the recording medium by ejecting ink from a printing head 111 while moving the printing head 111 relative to the recoding medium based on the received halftone image data. The printing head 111 comprises two nozzle groups in which plural nozzles are collectively arranged that are capable of ejecting ink of the same color and the same density. The printing formation apparatus 102 is constructed so that each nozzle group prints a partial image, and forms a final image by those images overlapping. A head drive circuit 110 generates a drive signal for controlling the printing head 111 based on halftone image data. The image formation apparatus 102 is such that based on the drive signal, the printing head 111 actually forms ink dots and prints an image on a recording medium.

Halftone Processor that Uses Threshold Matrices (Single Comparator)

In the following, the halftone processing unit 106 of this embodiment will be explained in detail.

Figure 2:
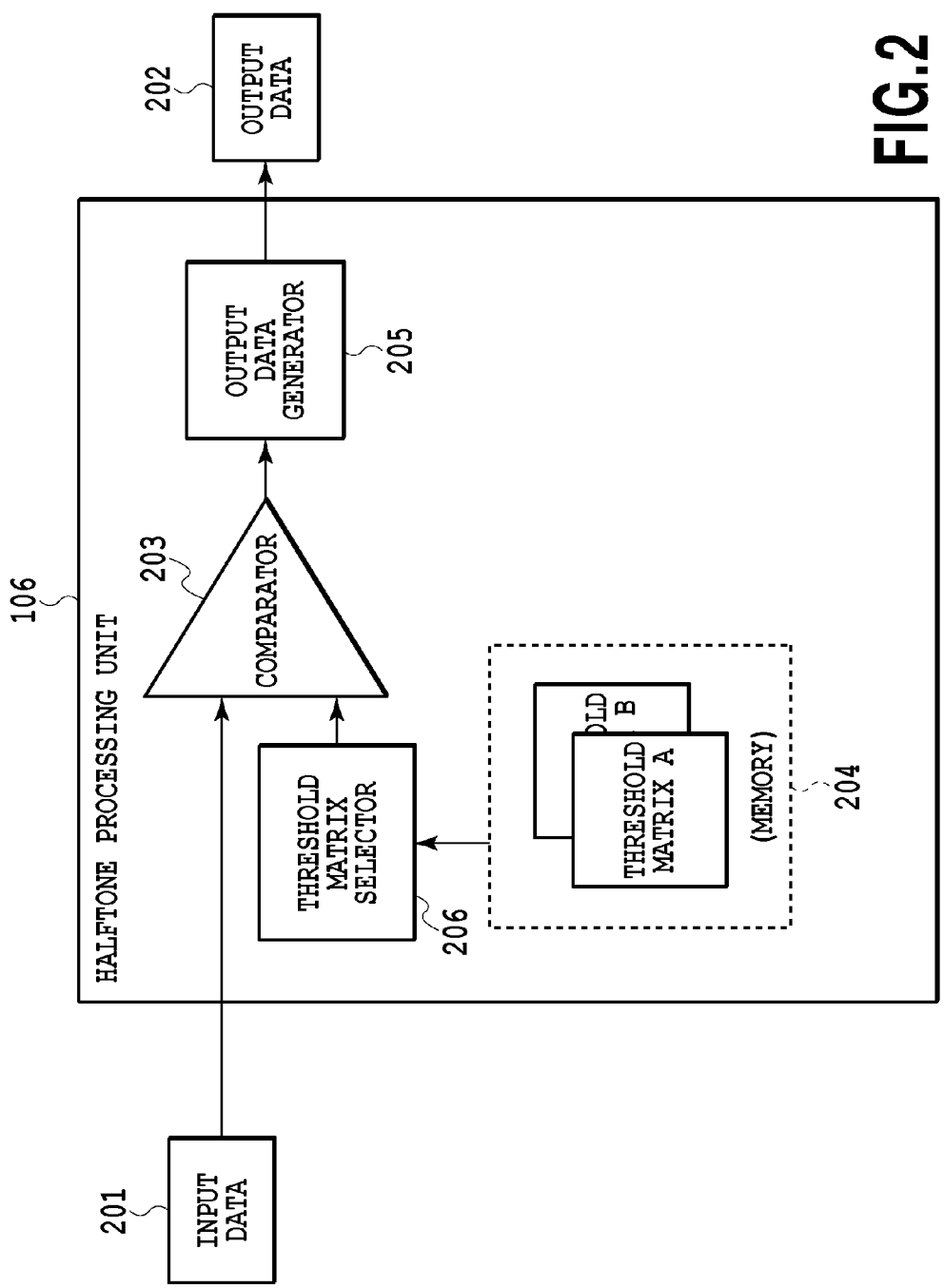
FIG. 2 is a block diagram illustrating the detailed configuration of a halftone processor.

FIG. 2 is a block diagram illustrating the detailed configuration of a halftone processing unit.

The halftone processing unit 106 has a comparator 203, a memory 204, an output data generator 205 and a threshold matrix selector 206. The halftone processing unit 106 receives input data 201, which is color separation data for 256 tone levels of black (K), from the color separation processing unit 105. Then, the halftone processing unit 106 converts the input data 201 to binary data for each nozzle group and outputs the result as output data 202. The memory 204 holds two threshold matrices (threshold matrices A and B) that respectively correspond to the two nozzle groups. The halftone processing unit 106 forms an image by way of the first nozzle group using threshold matrix A, and forms an image by way of the second nozzle group using threshold matrix B.

Figure 3:
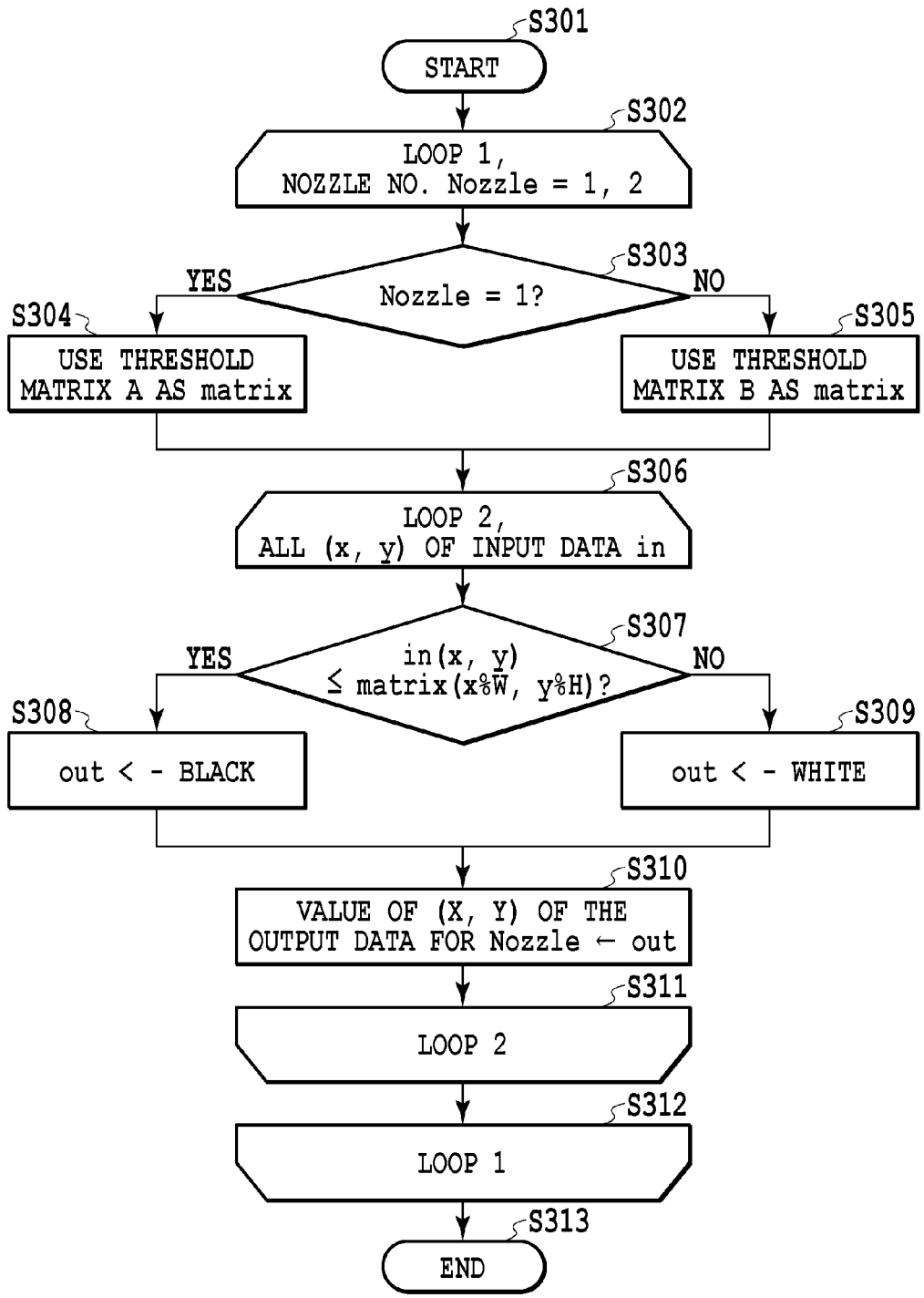
FIG. 3 is a flowchart illustrating the processing by the halftone processor.

FIG. 3 is a flowchart illustrating the processing by the halftone processing unit 106. In the following, the contents of the halftone process of this embodiment will be explained in detail with reference to FIG. 3.

In steps S302 and S303, the image processing apparatus 101 sets whether to perform halftone processing for the first nozzle group or to perform halftone processing for the second nozzle group. In this flowchart, the nozzle number that specifies the nozzle group is Nozzle, and for the first nozzle group, the nozzle number is assigned to Nozzle=1, and for the second nozzle group, the nozzle number is assigned to Nozzle=2. In steps S304 and S305, the threshold matrix selector 206 selects the threshold matrix that corresponds to the nozzle group that is the target of processing, and reads the matrix from the memory 204. As described above, the threshold matrix selector 206 reads threshold matrix A for the first nozzle group, and reads threshold matrix B for the second nozzle group, and sets the threshold matrix as matrix.

Next, the halftone processing unit 106 performs halftone processing for the nozzle group that is the processing target. The process theory here is the same as that known as typical dither processing. In this embodiment, of the pixels of the input data in, the pixel value of the pixel at coordinates (x, y) is expressed as input pixel value in (x, y). In the loop 2 from step S306 to step S311, the halftone processing unit 106 performs processing for all of the pixels of the input data in.

Particularly, in step S307, the halftone processing unit 106 compares the pixel value of the input data with the pixel value at the corresponding position in the selected threshold matrix. More specifically, the halftone processing unit 106 compares input pixel value in (x, y) with the pixel value matrix (x % W, jy % H). Here, W and H represent the width and height of the threshold matrix, and % represents the remainder operator.

In step S307, when the input pixel value is equal to or less than the matrix pixel value, processing moves to step S308, and the output value out is set to the value (BLACK) that indicates that a black dot will be formed. Otherwise, processing moves to step S309, and the output value out is set to the value (WHITE) that indicates that a dot will not be formed. In step S310, the output value out is set as (x, y) of the output data for the nozzle group of the processing target.

The halftone processing unit 106 performs the processing above for each of the nozzle groups (loop 1) and all of the pixels of the input data (loop 2), then ends the processing of this flowchart.

Figure 4:
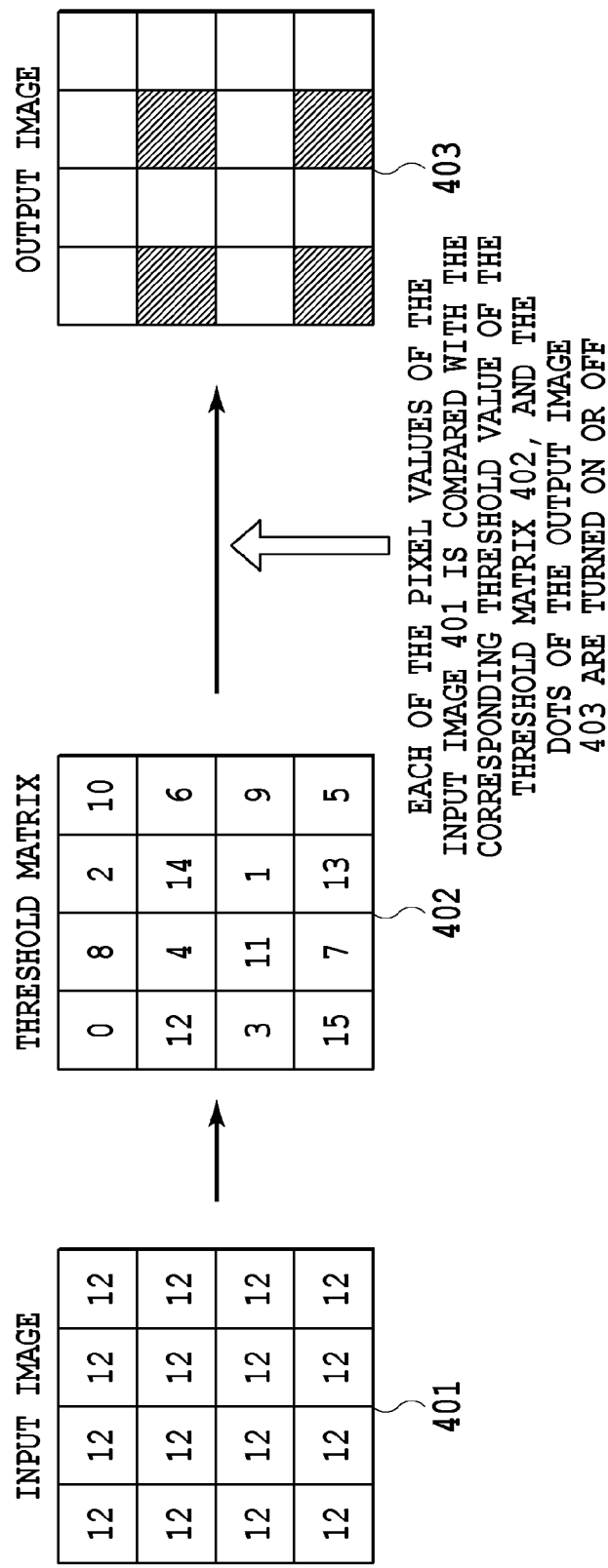
FIG. 4 is a drawing that explains a threshold matrix in a dither method.

Here, the threshold matrix that is used in the halftone processing above will be explained with reference to FIG. 4 that illustrates a typical dither method.

A threshold matrix 402 that corresponds to a nozzle group has a width W=4 and a height H=4, and stores threshold vales "0 to 15" for all of the pixels. The halftone processing unit 106 compares the pixel values of all of the pixels of an input image 401 with the threshold values of the threshold matrix 402, and when a pixel value is equal to or less than the threshold value, BLACK (a black dot is formed) is output as the value for the output image 403, and when the pixel value is greater than the threshold value, WHITE (no dot is formed) is output. Therefore, when a 4×4 threshold matrix 402 is used, the halftone processing unit 106 is able to obtain a dot arrangement that expresses 17 tone levels. When halftone processing is performed for an input image 401 that has a single pixel value 12, the halftone processing unit 106 obtains the output image 403. In this embodiment, there is this kind of threshold matrix that is used for each nozzle group of the printing head.

Figure 5:
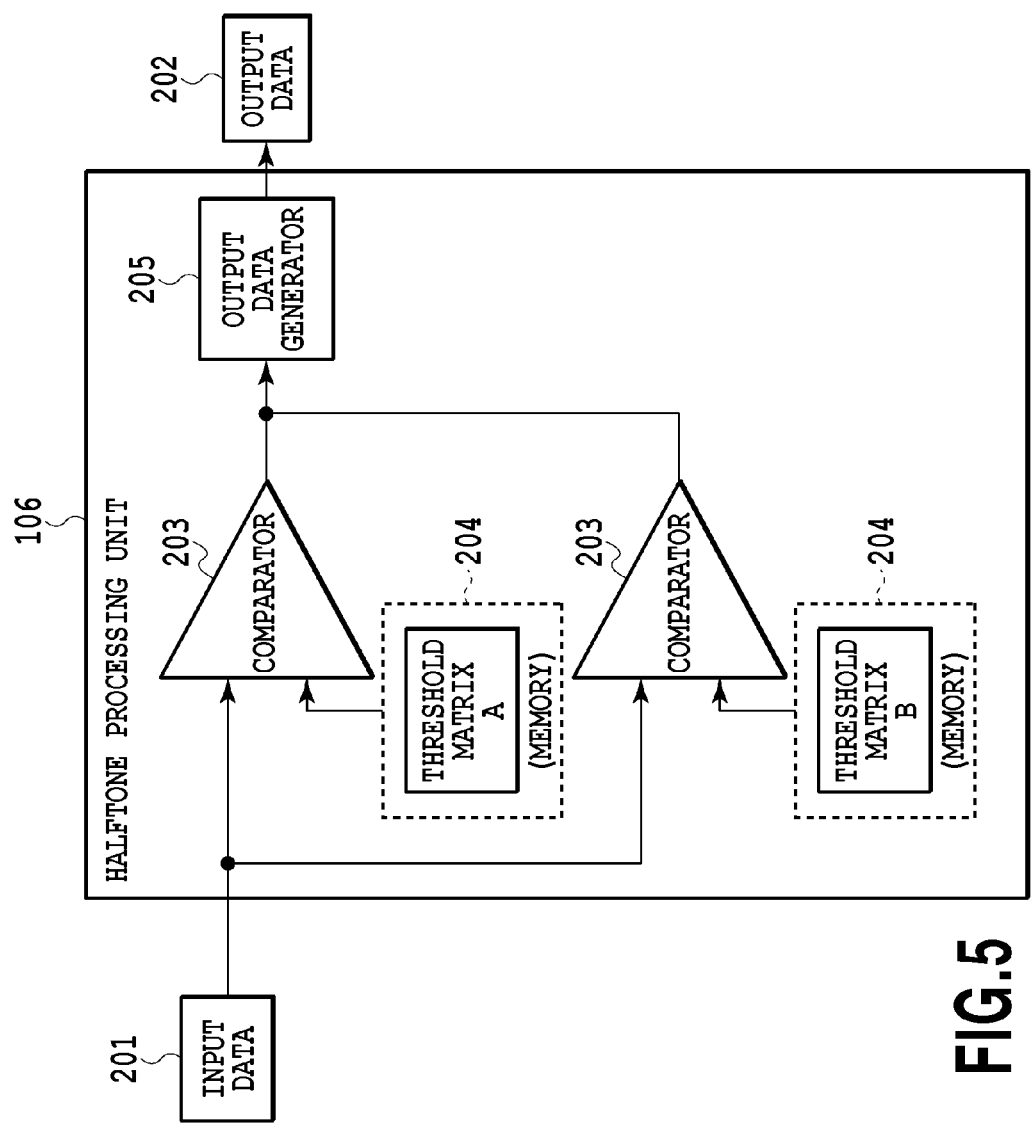
FIG. 5 is a block diagram illustrating the detailed configuration of a variation of a halftone processor.

Variation of a Halftone Processor that has Parallel Comparators for the Number of Nozzles The configuration and processing flow of a halftone processing unit 106 of this embodiment was described above. In the explanation above, it is described that a halftone processing unit 106 has one comparator 203, and a threshold matrix selector nozzle groups successively selects a threshold matrix for each of the to use and reads that matrix; however, the present invention is not limited to this, and it is possible to use other forms. For example, as illustrated in FIG. 5, it is also possible to use a form in which the halftone processing unit 106 has plural comparators 203, 204, and to perform halftone processing in parallel for each nozzle group. Furthermore, it is also possible to use a form in which both a process of successively selecting and reading threshold matrices that correspond to the nozzle groups, and a process of performing parallel processing for each nozzle group are used together. Moreover, the halftone processing unit 106 can also perform adjustment such as multiplying the input data in with a coefficient according to each nozzle group. In any form, it is possible to suitably use the threshold matrix that will be described below.

Multipath Printing

In this embodiment, the halftone process that sets the dot arrangement that will be formed by each nozzle group is performed using a threshold matrix. Here, two or more dot arrangements that are set by threshold matrices according to the present invention are good patterns in which dots are dispersed and arranged, and are good patterns in which dots are dispersed and arranged even when two or more dot arrangements are overlapped. Furthermore, even when two or more dot arrangements have a shift in position with respect to each other, the dispersion of the two or more overlapping dot arrangements is not damaged, and the halftone processing unit 106 is able to suppress fluctuations in lightness due to position shift of the two or more dot arrangements. These features will be explained below.

Figure 6:
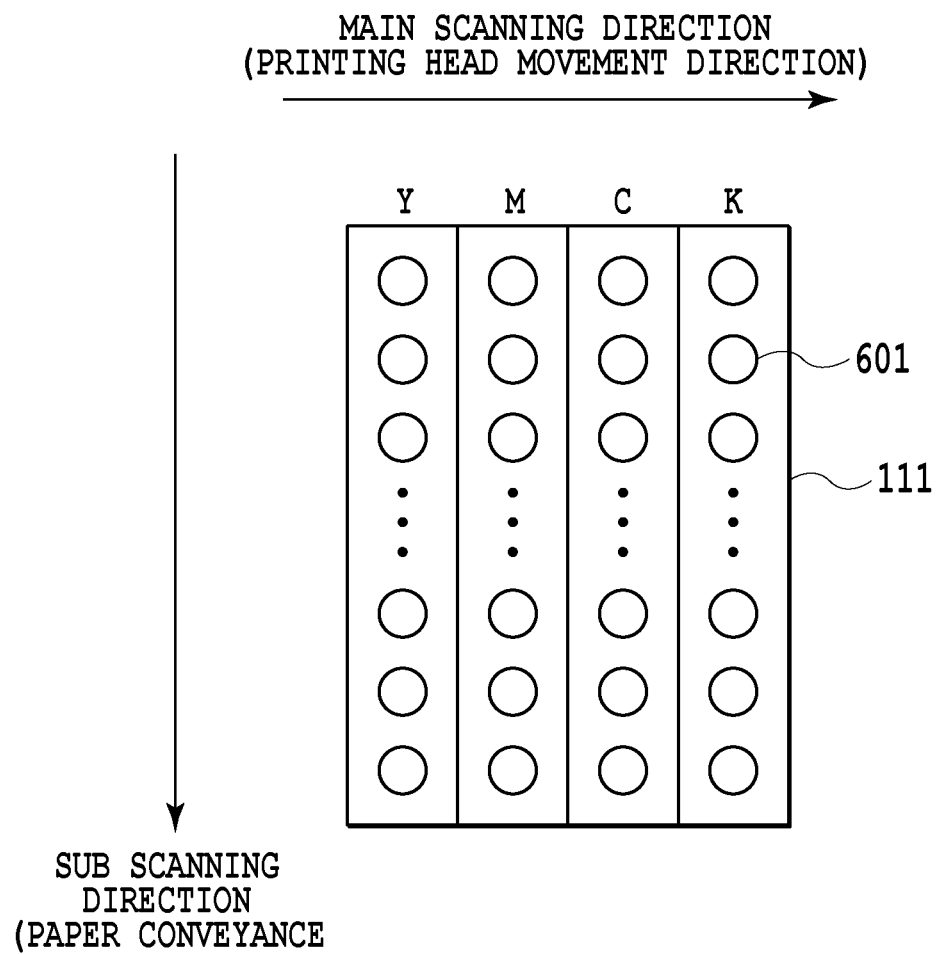
FIG. 6 is a drawing that schematically illustrates an example of the configuration of a printing head.

Here, the problem caused by position shift will be explained with reference to FIG. 6. FIG. 6 is a drawing that schematically illustrates an example of the configuration of a printing head 111. The printing head 111, as illustrated in FIG. 6, typically has nozzles 601 for four kinds of ink: cyan (C), magenta (M), yellow (Y) and black (K).

In the inkjet printing method, there is a multipath printing method by which a final image is formed by performing scanning plural times by different nozzle groups of a main scanning printing area on the same recording medium. The theory of the operation of the multipath printing method will be explained using FIGS. 7A and 7B.

Figure 7A:
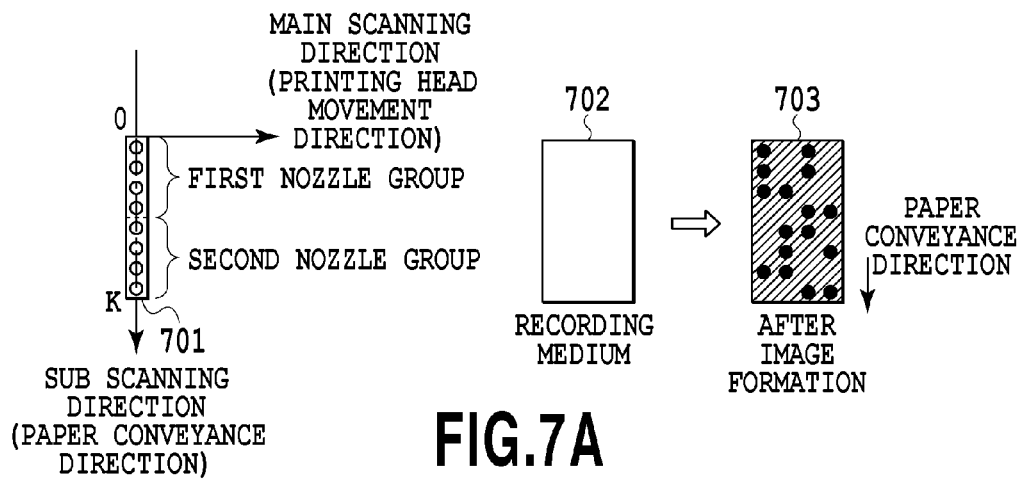
FIGS. 7A and 7B are schematic diagrams that explain the theory of a multipath printing method.

FIG. 7A illustrates the component elements of multipath printing. A printing head 701 has eight nozzles for K ink, with the top four making up a first nozzle group and the bottom four making up a second nozzle group. In the initial position, the top end of the printing head 701 is at the starting point 0. The printing head 701 does not move in the sub scanning direction (conveyance direction of the recording medium 702, and is the vertical direction in FIG. 7A), and forms an image on the recording medium 702 by repeatedly moving back-and-forth in the main scanning direction (horizontal direction in FIG. 7A). The length in the vertical direction of the recording medium 701 is the same as the length of the printing head, and has a width of four dots in the horizontal direction. The image 703 is an image that is to finally be formed on the recording medium 702. In the explanation below, the dots that form the image 703 are called row 1 to row 8 in order from the bottom.

Figure 7B:
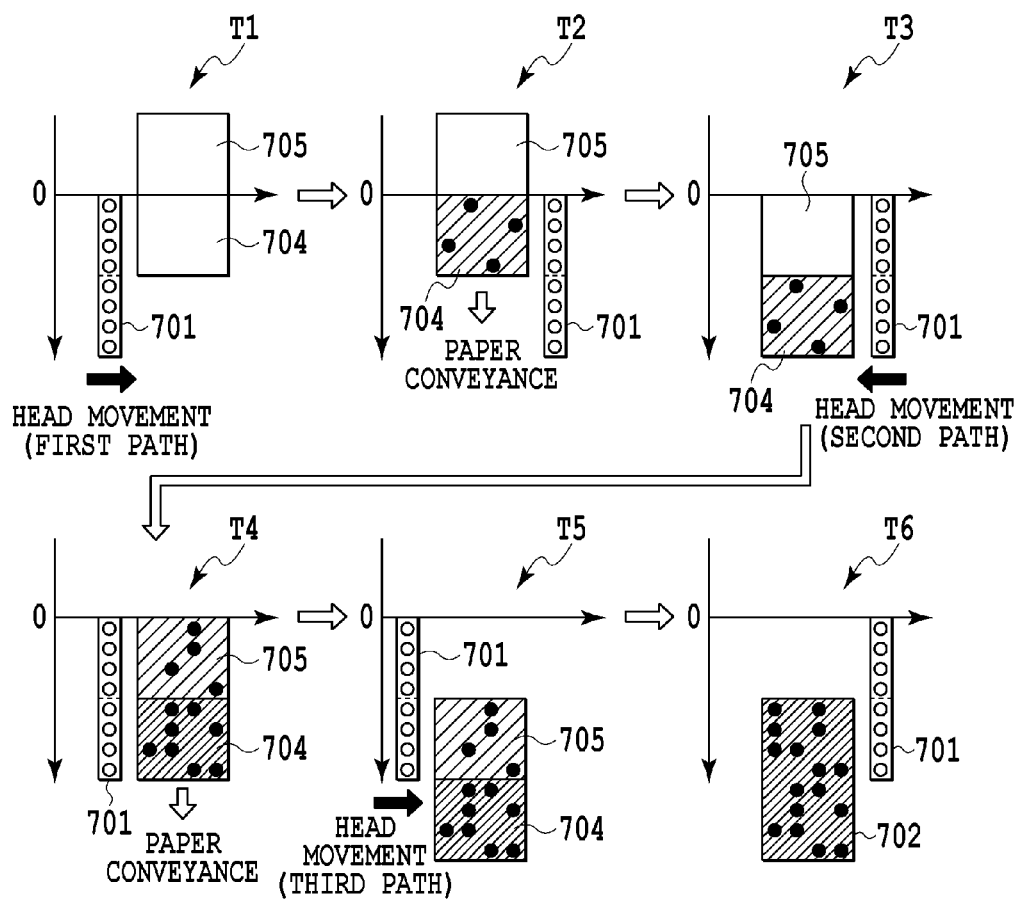

In multipath printing, as illustrated in FIG. 7B, an image is formed by performing the movement of the printing head 701 and the conveyance of the recording medium 702 in an alternating manner. The recording medium 702 and the printing head 701 are set at the initial position at T1. When image formation begins, the printing head 701 moves from the initial position toward the right and transitions to the state at T2. In the process of the printing head 701 passing over the area 704 at the bottom half of the recording medium 702, the first nozzle group forms part of the image 703 in the area 704. This process is called a path, the movement of the head from T1 to T2 corresponds to the first path. During this time, the dot arrangement of row 1 to row 4 is formed according to the threshold matrix A. Next, the recording medium 702 is moved the amount of four nozzles in the conveyance direction, and transitions from the state at T2 to the state at T3. Next, the printing head 701 is moved in the left direction. At this time as well, the printing head 701 ejects ink in the process of passing over the recording medium 702 (second path), and forms an image. After moving to the state at T4 by going through this path, printing (dot arrangement from row 1 to row 4 according to threshold medium B) by the second nozzle group overlaps in the area 704, and image formation in area 704 is completed. On the other hand, in area 705 image formation is performed only by the first nozzle group. That formed image corresponds to the dot arrangement from row 5 to row 8 according to the threshold matrix A. At T5, the recording medium 702 is again moved in the conveyance direction the amount of four nozzles, and the printing head 701 is prepared again to scan in the right direction. After scanning by the printing head 701 in the right direction (third path) is finished, the state transitions to the state at T6, and printing by the second nozzle group (dot arrangement from row 5 to row 8 according to the threshold matrix B) overlaps in area 705 as well, and the desired image 703 is formed on the entire surface of the recording medium 702. In this way, in multipath printing, the first nozzle group of the printing head 701 is controlled so as to form a dot arrangement according to the threshold matrix A, and the second nozzle group is controlled to form a dot arrangement according to the threshold matrix B on the recording medium 702.

The reason for the image formation apparatus to employ the multipath printing method is that in the single-path printing method that performs printing by scanning only one time, an excess amount of ink is supplied to the recording medium in a short amount of time, which causes a lot of bleeding, a long drying time, and wrinkling (warping) of the recording medium. Moreover, in the single-path printing method, it becomes easy for the formed image to be affected by the individual nozzle characteristics and have unevenness, and when there is a nozzle that is not operating properly, there is a possibility that problems will occur such as white horizontal lines appearing from end to end of the recording medium, and the desired color saturation may not be sufficiently outputted. In multipath printing, it is possible to suppress such problems.

Position Shift (Complete Exclusion)

In the multipath printing method, however, a shift in the position from the target position may occur in the image that is formed by each scanning by the nozzle groups. In an actual image formation apparatus it is difficult to eliminate fluctuation of the physical registration related to the conveyance amount of the recording medium or position displacement of the nozzles during movement of the printing head. Therefore, a small amount of shifting occurs each time the printing head moves back-and-forth and the recording medium is conveyed, and that shifting is reflected in the impact position of the ink. Shifting of the impact position of the ink of each nozzle group leads to not being able to form the intended image when overlapping the plural printings by the nozzle groups. More specifically, shifting of the impact position of the ink of each nozzle group causes lightness fluctuation, density unevenness, degradation of the graininess, and the like.

Figure 8:
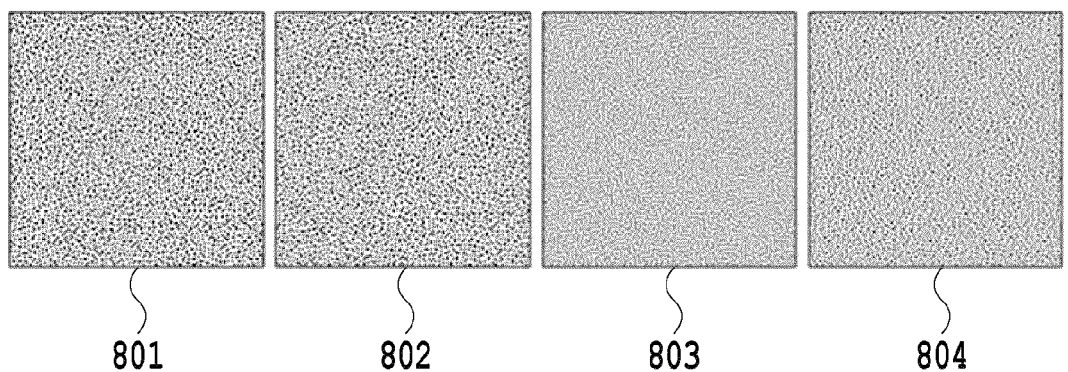
FIG. 8 is a drawing that illustrates an example of dot arrangements.

FIG. 8 is a drawing that illustrates an exemplary group of dot arrangements that express a certain tone level. This will be explained in detail below with reference to FIG. 8. Dot arrangements 801 and 802 have high dispersion, and are good dot arrangements. Dot arrangement 803 is the result of combining dot arrangement 801 and dot arrangement 802 with no position shift. In dot arrangement 803, when two black dots overlap, the pixel is displayed as black (pixel value: 0), when there is one black dot with no overlap, the pixel is displayed as gray (pixel value: 128), and when there are no black dots, the pixel is displayed as white (pixel value: 255). In the combined dot arrangement 803 as well, the dot arrangement is disperse, and is a good dot arrangement.

Here, dot arrangement 801 is the dot arrangement by the first nozzle group, dot arrangement 802 is the dot arrangement by the second nozzle group, and the image that is finally formed by overlapping and combining printing by the first and second nozzle groups is expected to become as dot arrangement 803. However, when a position shift such as described above occurs, a pattern such as that of dot arrangement 804, for example, is formed. Dot arrangement 804 is the result of overlapping and combining dot arrangement 802 that has shifted one pixel to the left, and dot arrangement 801. Dot arrangement 804 includes much unevenness in the sparse and dense dots, so from the aspect of graininess, is a pattern that is not desirable. Moreover, in dot arrangement 804, when compared with dot arrangement 803, the tone level is different, and fluctuation in lightness occurs. Shifting of the impact position of the ink leads to this kind of degradation of image quality.

The reason that the phenomenon illustrated in FIG. 8 occurs will be explained with reference to FIG. 9.

Figure 9:
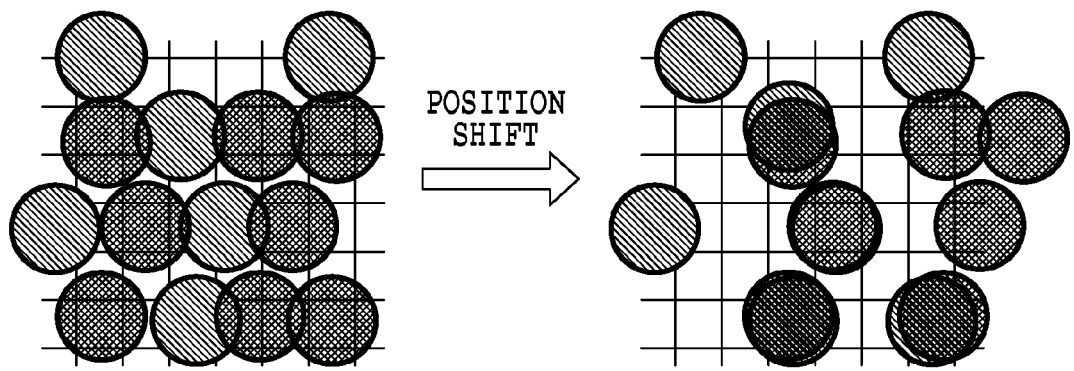
FIG. 9 is a schematic diagram illustrating dot arrangements when a position shift occurs.

FIG. 9 is a schematic diagram illustrating two overlapping and combined dot arrangements (black dots having different coarseness are indicated with hatching). The left part of FIG. 9 illustrates a dot arrangement in which there is no shifting of the impact position of ink, and when there is no position shift, there is no overlapping of black dots, so the intended uniform dot arrangement is formed. The right part of FIG. 9 illustrates a dot arrangement in which there is shifting of the impact position of ink, and when there is a position shift, there is a large occurrence of black dots in one dot arrangement being overlapped by black dots in the other dot arrangement, so sparse and dense dot distribution occurs. Furthermore, due to the existence of black dots overlapping black dots, there is a change in the ink coverage on the recording medium. In other words, the percentage of the surface of the recording medium that is exposed (white background) changes, however, the portions where black dots overlap black dots at this time do not have double the density when compared with when there is one black dot during actual printing, and the density becomes lower. Therefore, bright tone levels are seen more than when there is no shifting in the impact position.

Furthermore, the reality that FIG. 8 suggests is that even when the formed images by the first nozzle group and second nozzle group are both dot arrangement that have high dispersion, and the overlapping combination also becomes a dot arrangement having high dispersion, there is not always robustness against position shift. In other words, FIG. 8 suggests the reality that fluctuation in lightness occurs due to differences in the number of overlapping black dots.

Position Shift (No Correlation)

Figure 10:
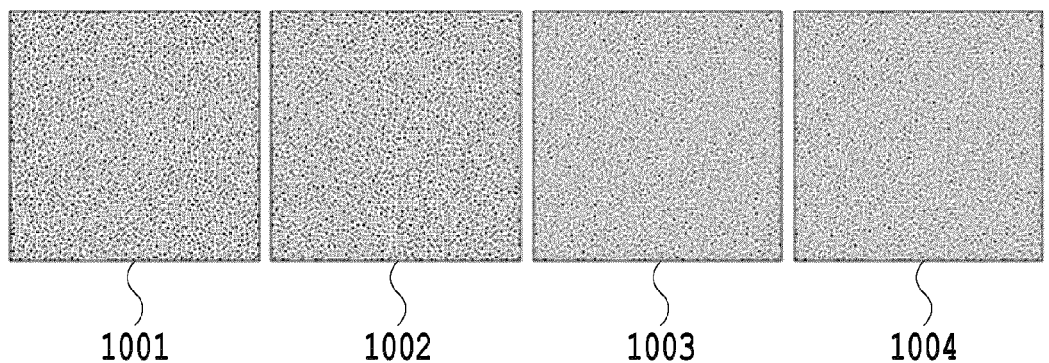
FIG. 10 is a drawing that illustrates an example of dot arrangements.

On the other hand, when there is a plan to have robustness against simple position shift, a set of dot arrangements 1001 and 1002 as illustrated in FIG. 10 is possible. These dot arrangements are made using the same method in which only the initial values are changed so as not to be correlated with each other. The dot arrangement 1003 is the result of overlapping and combining dot arrangement 1001 and dot arrangement 1002 with no position shift. Dot arrangement 1004 is the result of overlapping and combining dot arrangement 1002 that has shifted one pixel to the left and dot arrangement 1001. According to FIG. 10, no large difference can be seen in the pattern of the dot arrangements between dot arrangement 1003 and dot arrangement 1004. Therefore, this means that the dot arrangements 1001 and 1002 illustrated in FIG. 10 are not easily affected by position shift, and can be said to be robust against position shift. However, the pattern of dot arrangement 1003 includes much density unevenness, and is not a good dot arrangement in regard to graininess.

Low-Frequency Reverse Phase/High-Frequency No Correlation

From the results illustrated in FIG. 8 and FIG. 10, the set of threshold matrices that generates dot arrangements that have robustness against position shift and have good image quality should have the following features. In other words, this kind of set of threshold matrices should generate a set of dot arrangements that take into consideration dispersion of dots when the dot arrangements are overlapped and combined, and in which the number of overlapping dots does not change even when shifting of the impact position of ink occurs. The concept of low-frequency reverse phase/high-frequency no correlation (randomness), which is related to this, will be explained.

Figure 11:
FIG. 11 is a drawing that schematically expresses the change in quality of a formed image that corresponds to position shift.

FIG. 11 is a diagram that schematically expresses for various conditions the change in product quality of a formed image when shifting of the impact position of ink occurs. In the figure, the graph sections in each field illustrate the density distribution of the formed image under each condition, where the solid lines indicate the density of the image formed by the first nozzle group, and the dashed line indicates the density of the image formed by the second nozzle group. High frequency and low frequency referred to here is relative, and actual specific values are set according to parameters such as the resolution, observation distance and the like of the image, and whether the dot arrangement is as desired.

First, in regard to the high-frequency areas of the formed image, the top part of FIG. 11 is examined. When the density distributions by the first nozzle group and the second nozzle group have reverse phase, the peaks and valleys of the density distribution have a complementary relationship when there is no position shift, and dots are embedded equally over the paper surface. Therefore, the formed image 11 has few white areas, and has a high density. When there is position shift, the density distributions by the first nozzle group and second nozzle group have an overlapping relationship. Therefore, in the formed image 12, white areas can be easily seen, and there is a tendency for low density. In other words, when density distributions have reverse phase in the high-frequency component, the density tolerance against position shift becomes low, so lightness fluctuation easily occurs as illustrated in the comparison table 13. On the other hand, as illustrated in the right field of FIG. 11, in the high-frequency area, when the density distributions are not correlated (random), there is hardly any difference in density between the formed image 14 and formed image 15 even when a little position shift occurs. Therefore, lightness fluctuation does not easily occur as illustrated in the comparison table 16, and there is hardly any degradation of graininess.

Next, in regard to the low-frequency area of the formed image, the lower part of FIG. 11 will be examined. When the density distributions by the first nozzle group and second nozzle group have reverse phase, the low-frequency component that is visually and easily detected is reduced, and degradation of graininess is suppressed (formed image 17, comparison table 19). Furthermore, even when there is a little position shift, the peaks and valleys of the density distribution by the first nozzle group and second nozzle group hardly change, so lightness fluctuation also does not easily occur (formed image 18, comparison table 19). On the other hand, when there is no correlation between the density distributions by the first nozzle group and the second nozzle group, a low-frequency component appears in the image regardless of the occurrence of position shift. Therefore, graininess degrades, and a visually good image is not obtained (formed images 20, 21, comparison table 22).

From the above, it can be seen that in order to obtain a formed image that has little lightness fluctuation or density unevenness due to position shift, and has good graininess even when there is no position shift, dot arrangements that are formed by passes by different nozzle groups should satisfy the two conditions below. That is, the dot arrangements should: (1) have reverse phase for the low-frequency component that can be visually and easily detected; and (2) should not be correlated and should not have special phase correlation for the high-frequency component.

When re-examining the phase difference between the dot arrangements illustrated in FIG. 8 and FIG. 10, it can be confirmed that these two conditions are not satisfied.

Figure 12:
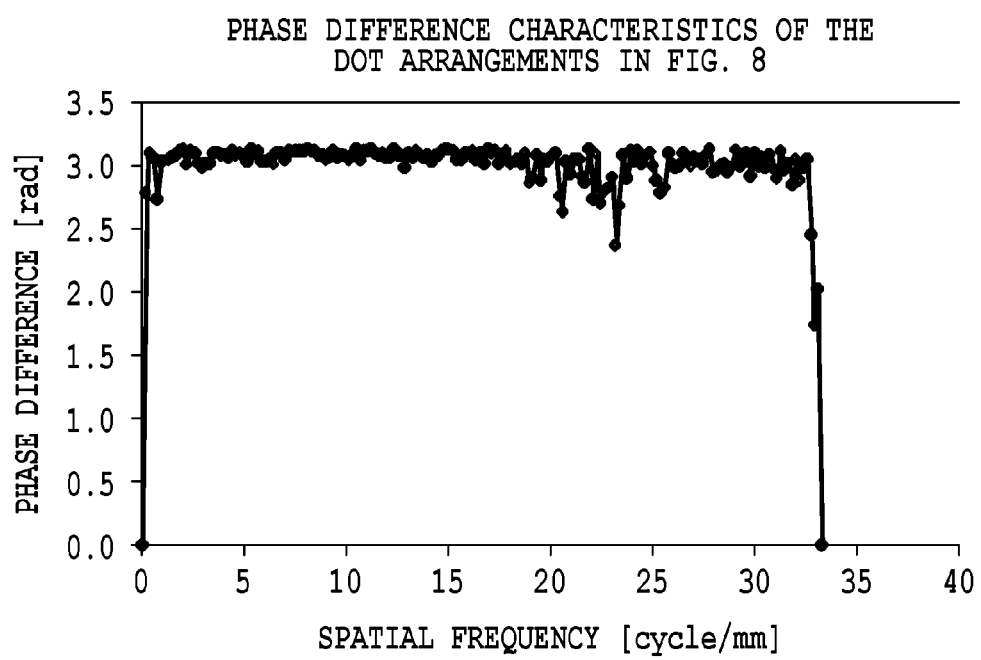
FIG. 12 is a characteristic diagram that illustrates the phase difference of a group of dot arrangements.
Figure 13:
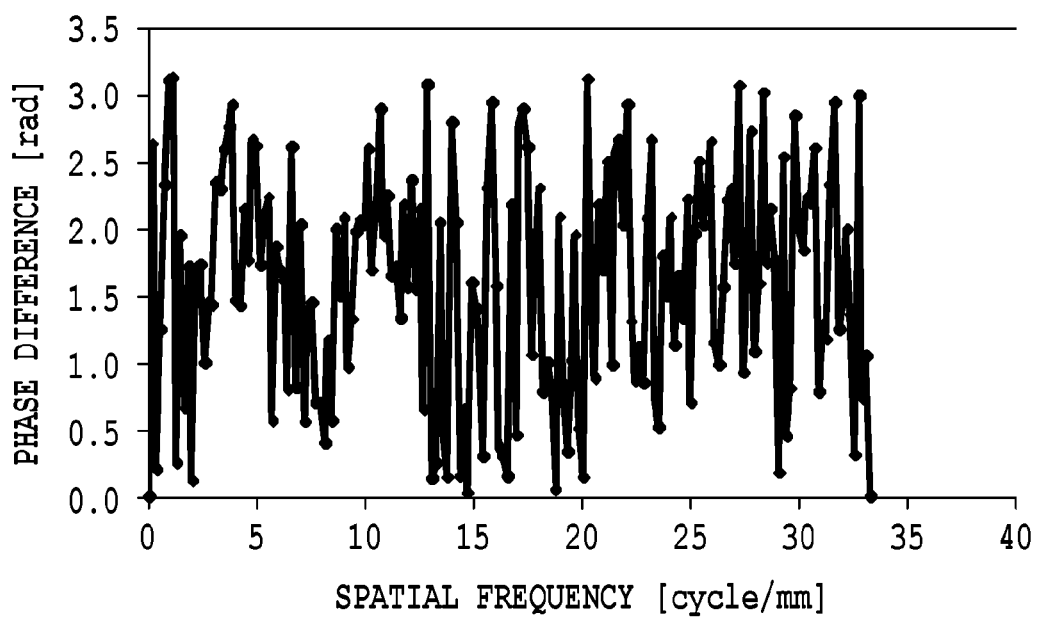
FIG. 13 is a characteristic diagram that illustrates the phase difference of a group of dot arrangements.

FIG. 12 and FIG. 13 are characteristic diagrams that illustrate the characteristics of the phase differences of dot arrangements that correspond to FIG. 8 and FIG. 10 plotted with respect to the frequency component. These characteristics can be calculated by frequency analysis. In complex number Fourier transformation of two dot arrangements, a cross spectrum is calculated by multiplication with one conjugate, and the argument of the circumferential average of the cross spectrum (ensemble average of the phase difference of frequencies having equal radial frequencies) is found. FIG. 12 illustrates the phase difference of dot arrangements in the set of the two threshold matrices illustrated in FIG. 8, and FIG. 13 illustrates the phase difference of the two dot arrangements illustrated in FIG. 10. In both figures, the horizontal axis indicates the spatial frequency. The vertical axis indicates the phase difference in radians, and is 0 when the phases are the same, and is $\pi(\approx3.14)$ when the phases are reverse. In this embodiment, in general, the 0 to 20 cycles/mm spatial frequency area corresponds to the low-frequency area, and the 20 cycles/mm or greater spatial frequency area correspond to the high-frequency area. As can be seen in FIG. 12, the patterns in FIG. 8 have reverse phase over the entire frequency range. The phase difference illustrated in FIG. 13 is random, so the patterns in FIG. 10 are not correlated over the entire frequency range. It can be confirmed that these frequency characteristics, and the characteristics found from the explanation of FIG. 11, do not contradict the results that appear in both FIG. 8 and FIG. 10.

Figure 14:
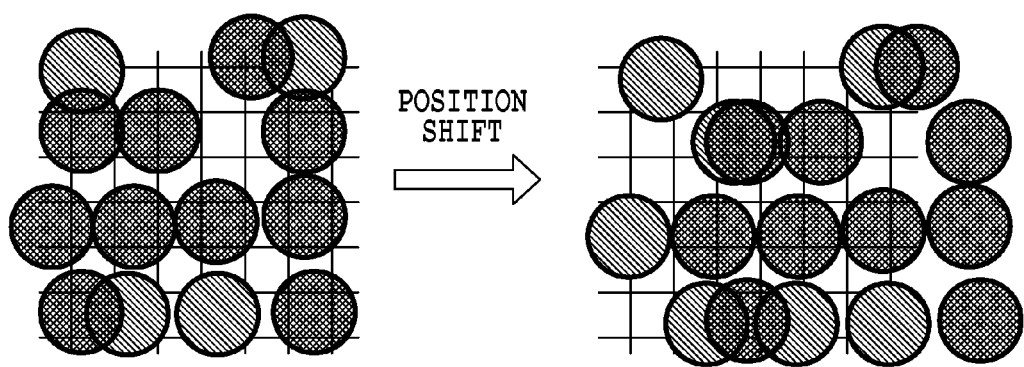
FIG. 14 is a diagram that illustrates an example of a dot arrangement.

The reverse phase over the entire frequency range of the patterns in FIG. 8, in general terms, is that the patterns are formed complementarily or exclusively so that the dots fill in each other's blank spaces. In other words, this corresponds to a characteristic that the peaks and valleys of the density distributions by the first nozzle group and the second nozzle group are opposite each other. On the other hand, the aspect that the low-frequency reverse phase dot arrangement is expected to be a good pattern is schematically illustrated in FIG. 14. In other words, in an overlapped and combined dot arrangement, in a state of no position shift, there already exists some dot overlap. Consequently, when a position shift occurs, new dot overlapping occurs, however, at the same time, the existing dot overlapping is lessened, so as a result, an effect of reduced lightness fluctuation and density unevenness occurs.

Merit of Low-Frequency Reverse Phase Threshold Matrices

In another embodiment, by the image processing apparatus applying a set of threshold matrices to the dot arrangements of each nozzle group according to the characteristics described above, the image processing apparatus is able to form an image that is robust against position shift and that has high image quality. This means that during image formation there is no need for adaptive processing that includes feedback processing (in other words, referencing the printing results of the previous path, and taking into consideration the effect of position shift). Moreover, it is possible to set the dot arrangements for each nozzle group directly from the input image, so after the overall dot arrangement has been set, there is no need for an assigning process (called path resolution) for the dots formed by each nozzle group. This is able to contribute to increasing the processing speed and reducing the processing load. Furthermore, directly controlling the formed dot arrangements with the threshold matrices is simple, so when compared to the conventional technology, there is an advantage of being able to easily achieve the desired dot arrangements.

Method for Creating Threshold Matrices

Figures 15, 15A:
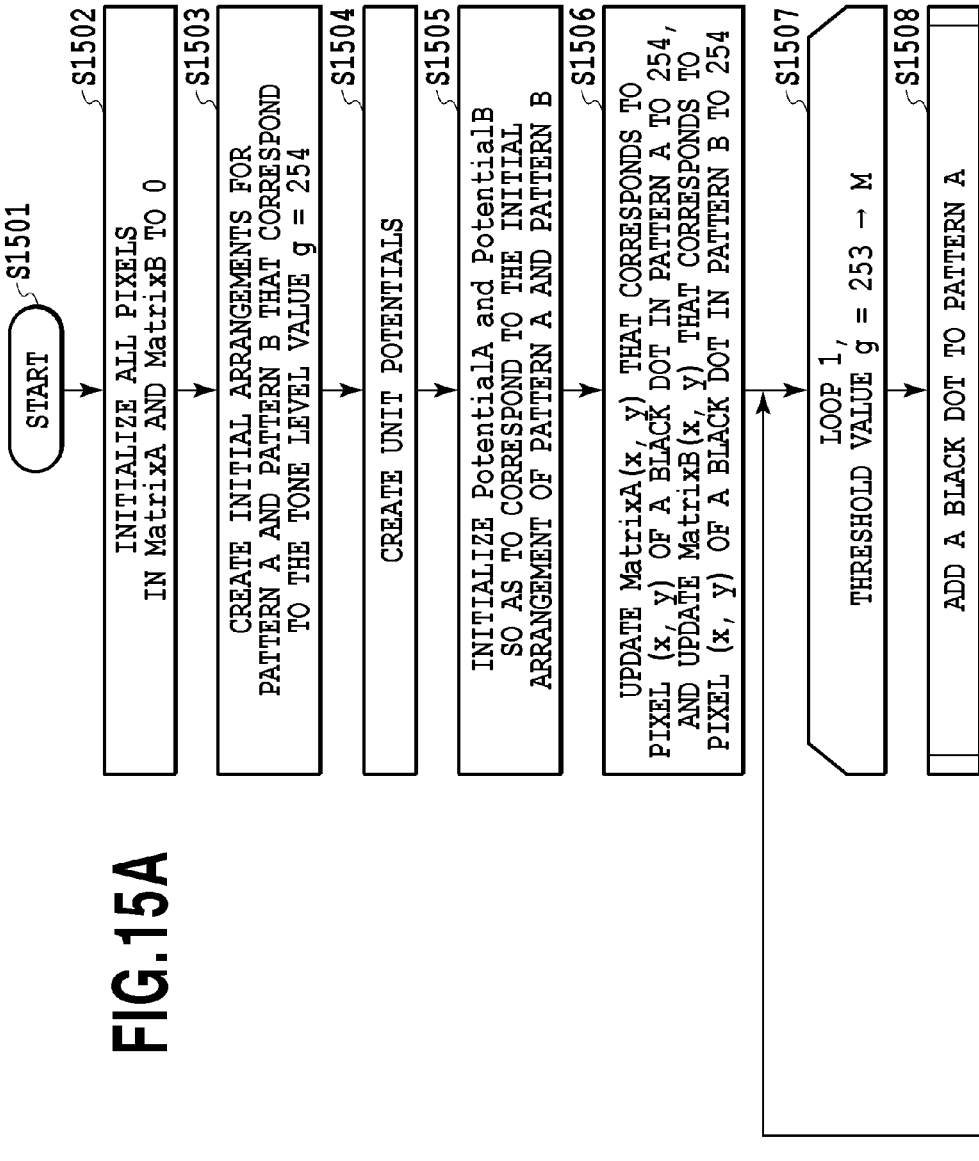
FIG. 15 is a diagram showing the relationship of FIGS. 15A and 15B, FIGS. 15A and 15B are flowcharts that illustrate the processing contents of a method for creating threshold matrices of a first embodiment.
Figure 15B:
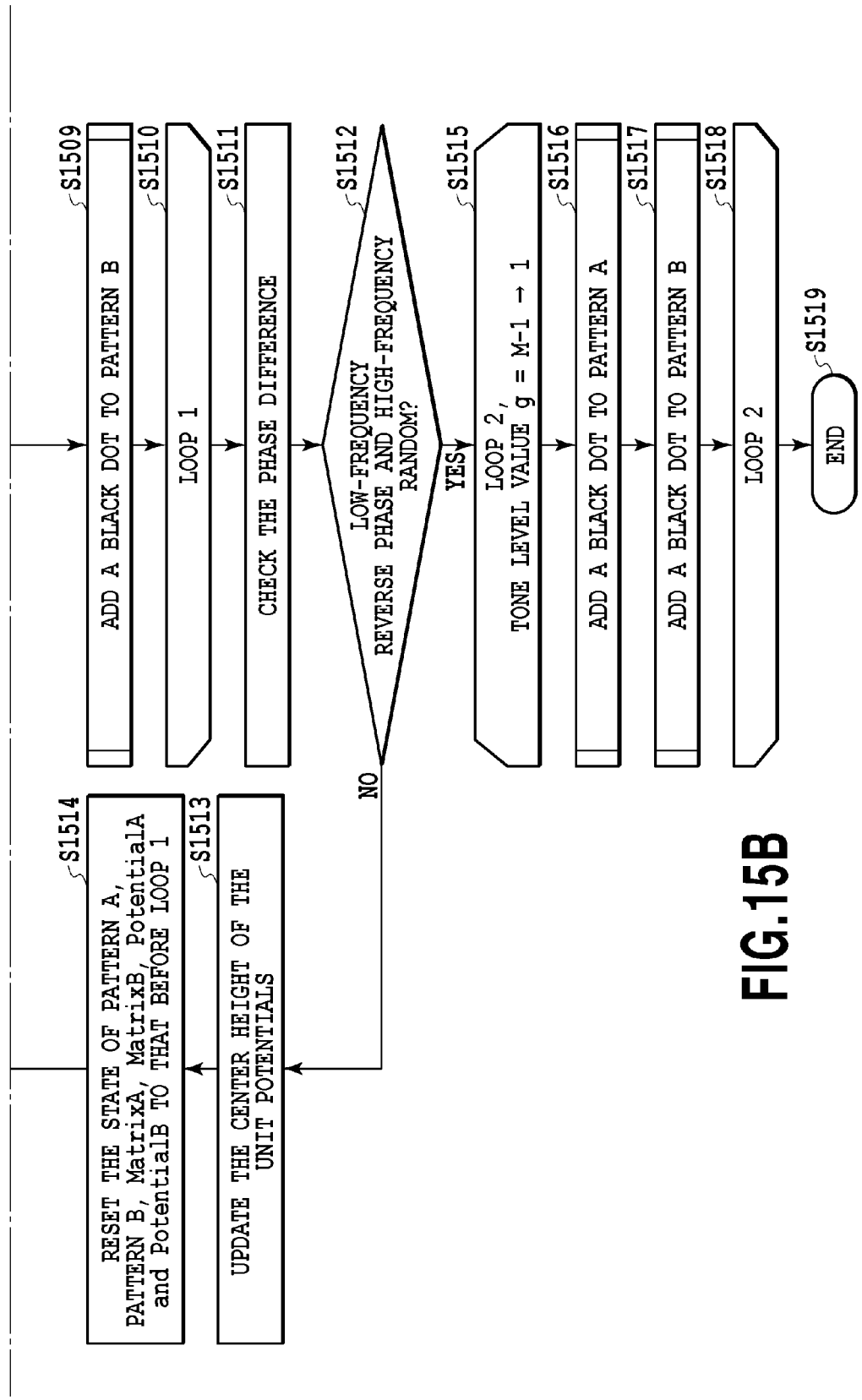
Figure 16:
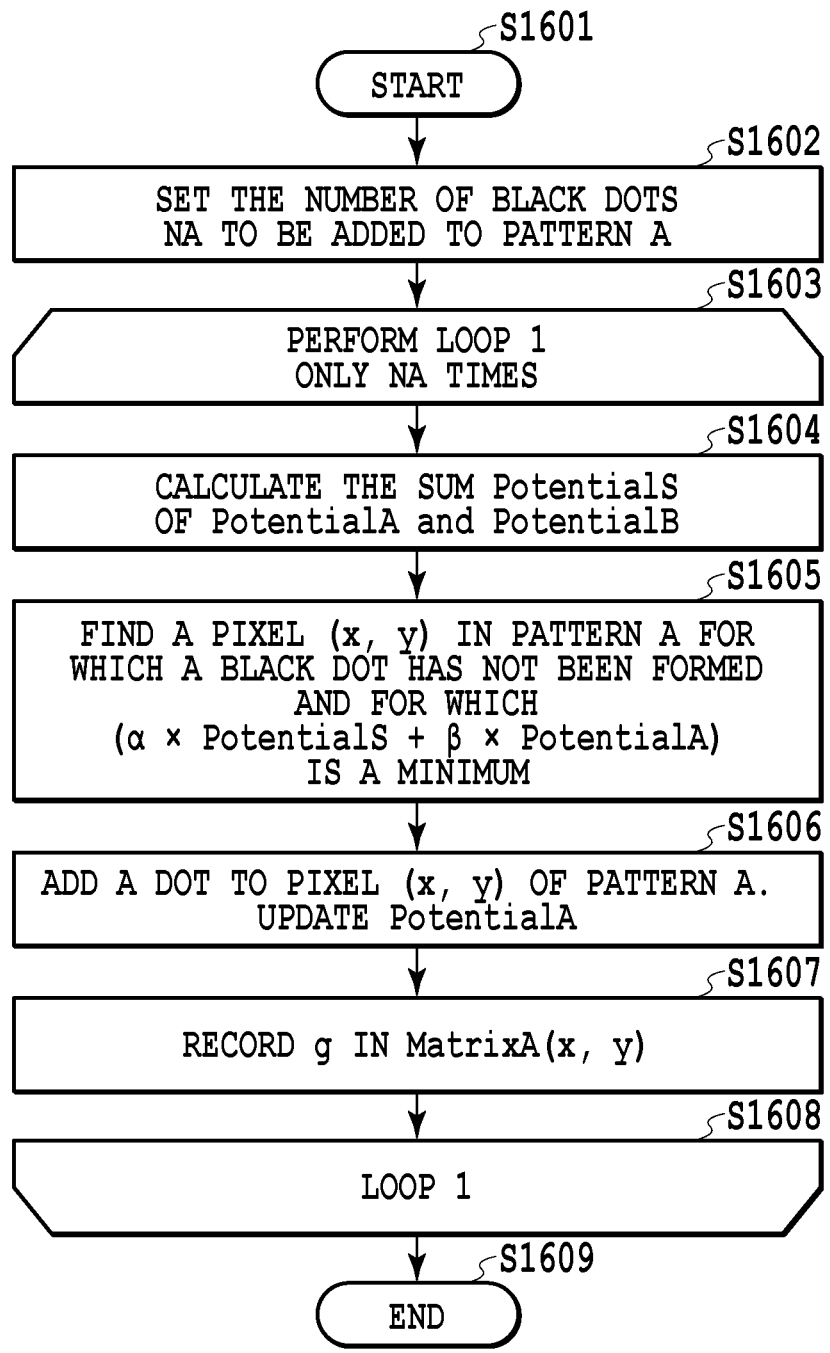
FIG. 16 is a flowchart illustrating part of the processing contents of flowchart in FIG. 15.

The method for creating the threshold matrices of this embodiment will be described below. FIGS. 15A and 15B are flowcharts illustrating the processing contents of the method for creating the threshold matrices of this embodiment. FIG. 16 is a flowchart illustrating in detail the process ing contents of step S1508 in FIG. 15A. The threshold matrices that are created here correspond to 8-bit grayscale, and follow the rule that when a pixel value of the input image is equal to or less than the threshold value in the threshold matrix, a black dot will be output. The size of the threshold matrices is arbitrary, however, using a square shape (for example, 256×256) having sides with lengths that are an exponent of 2 is preferred.

In this embodiment, an example will be explained in which the threshold matrices are created going from a brighter tone level toward a darker tone level. In other words, in step S1502, the halftone processing unit 106 sets all of the pixels in MatrixA and MatrixB to be 0 as an initialization process for the set of threshold matrices (MatrixA and MatrixB).

Next, in step S1503, the halftone processing unit 106 arbitrarily creates two initial dot arrangements that correspond to the brightest tone level value 254. Here, the initial dot arrangement that corresponds to MatrixA will be called pattern A, and the initial dot arrangement that corresponds to MatrixB will be called pattern B. Patterns A and B are matrices that have the same size as the threshold matrices, and have as pixel values black (for example, 0 in the case of 8-bit format) or white (255 in the case of 8-bit format). Here, pattern A and pattern B are arbitrary, however, preferably both have high dispersion, and preferably the dot arrangement that is the result of overlapping and combining both patterns also has high dispersion. For example, it is possible to divide and create dot arrangements having high dispersion that were obtained using a well-known method for pattern A and pattern B so that there is as little deviation as possible.

Continuing, in step S1504, the halftone processing unit 106 gives a weighting to a pixel that corresponds to the position where a black dot is located, and to the pixels around that pixel by placing dots. More specifically, the halftone processing unit 106 creates matrices called unit potentials (potential functions) that correspond to one black dot. Here, the unit potentials are mathematical functions that spread from the position of a black dot being focused on, and more specifically, specify a function that monotonically decreases according to the distance from the starting point. In other words, the functions used here are functions for setting weighting so that a pixel where a black dot is located is a maximum value, and so that value decreases the further the distance is from a pixel where a black dot is located. Such a function is called a cone because the shape resembles that of a cone. This can also be interpreted as being a function like an energy function that expresses a repulsive force between black dots. However, if some values can be set, then that meaning is not adhered to. This embodiment will be explained using the two-dimensional Gaussian function σ=1.5 (see FIG. 17) that is normalized as the unit potential so that the value at the apex is 1.00. The weighting that is given to each pixel according to the location of black dots will be explained below using potential as an example.

For the unit potentials that were created in step S1504, in step S1505, the halftone processing unit 106 initializes potential maps PotentialA, PotentialB that correspond respectively to pattern A and pattern B. Here, the potential maps are matrices that have the same size as the threshold matrices, and the pixel values are the sums after the unit potentials act on the dot arrangements. In the detail processing procedure, in step S1505, the halftone processing unit 106 first sets all of the pixels of PotentialA and PotentialB to be 0. Next, the halftone processing unit 106 focuses on a certain black dot in the dot arrangements and calculates unit potentials centered on that position. Then, the halftone processing unit 106 adds the unit potentials that were calculated from the dot arrangements A and B, and applies the added value to the potential maps for each pixel. These processes are repeated for all of the black dots. When doing this, periodic boundary conditions are provided so that the left end and right end, and the top end and bottom end of the potential maps come in contact and are continuous. After initialization is finished, the potential maps correspond to the dot arrangements, and the values of the potential that correspond to pixels near the black dots become large. On the other hand, the values of the potential that correspond to pixels that are not near black dots should become smaller.

Processing then Moves on to Step S1506 and the halftone processing unit 106 updates the value of the position (x, y) of MatrixA that corresponds to a position (x, y) of a black dot in pattern A to 254. The halftone processing unit 106 similarly updates the position (x, y) of MatrixB. As soon as the processing of step 1506 ends, initial processing for the bright tone level having a tone level value g=254 ends.

Next, processing is performed in succession for darker tone levels. The processing of steps S1507 to S1510 form a loop 1, in which the halftone processing unit 106 performs processing for adding black dots to the dot arrangements of patterns A and B up to a number M that corresponds to each tone level from the tone level value g=253. FIG. 16 is a flowchart illustrating in detail the processing contents for pattern A in step S1508, however, the processing contents for pattern B in step 1509 are the same, and only the processing target is different.

In step S1602 of FIG. 16, the halftone processing unit 106 sets the number of black dots NA to add in correspondence to the tone level value g currently being processed. In the simplest form, NA can be the result of dividing the total number of pixels by the total number of tone level values. Alternatively, by taking into consideration the effect of the dot gain during image formation, NA can be different for each tone level, or could be a number that takes into consideration the overlapping state of black dots on black dots.

After the number of black dots NA has been set, processing moves to step S1603, and the halftone processing unit 106 adds black dots one at a time to pattern A. More specifically, in step S1604, the unit potential for potential map PotentialA and the unit potential for potential map PotentialB are added for each pixel, and PotentialS is obtained by applying the added values. Next, moving to step S1605, the halftone processing unit 106 sets the position where a black dot is to be added. This position is a position in pattern A where there still is no black dot, and is the position (x, y) for which the result of calculating the potential evaluation equation ($\alpha \times$PotentialS+$\beta \times$PotentialA), which corresponds to a potential function that sets the position where a black dot is to be added, is a minimum. Here, $\alpha$ and $\beta$ are arbitrary coefficients. From experimentation by the applicants, it was found that $\alpha$=1.0 and $\beta$=0.3 are suitable. When plural positions are found for which the result of the potential evaluation equation is a minimum, the halftone processing unit 106 randomly selects one of the positions (x, y). Next, in step S1606, the halftone processing unit 106 places a black dot at position (x, y) in pattern A, and calculates a unit potential that is centered on the position (x, y) of the corresponding potential map PotentialA. In step 1608, the halftone processing unit 106 replaces MatrixA (x, y) with tone level value g. Loop 1 from step S1603 to step S1608 is repeated only NA times equal to the number of black dots to be added, after which the processing of this flowchart ends.

Returning to FIG. 15B, the halftone processing unit 106 performs the same processing for pattern B. In FIG. 16, by replacing "A" with "B" and "NA" with "NB", it is possible to obtain the processing for pattern B. As soon as step S1509 is finished, processing of patterns A and B for tone level value g ends. The halftone processing unit 106 repeats the loop 1 from step S1507 to step S1510 and performs processing from tone level value g=253 up to a specified tone level value M (M is an arbitrary value).

Distinctive Processing of the Method for Creating Threshold Matrices of the Present Invention In the processing up to this point, threshold matrices have been created from a bright tone level to an Mth darker tone level. This threshold matrix is a good pattern in which the dot arrangements are dispersed well, and is a good pattern in which overlapped and combined dot arrangements are dispersed well. This is because in the potential evaluation equation ($\alpha \times$PotentialS+$\times$PotentialA), the first member functions as a member that improves the dispersion when dot arrangements are overlapped, and the second member functions as a member that improves the dispersion of an individual dot arrangement. However, robustness against phase shift (no degradation in image quality) is not assured by the potential evaluation equation. Therefore, when creating threshold matrices up to the Mth tone level, the halftone processing unit 106, in step S1511, performs a check of the robustness against position shift. The value of M, as described above, can be arbitrarily set by the user. In the dot arrangements created by this method, it is generally possible to obtain the same phase difference characteristic without the tone level value. However, in the case of highlights or shadows where there is deviation in the dot ratio, the detailed characteristic maybe a little different, so selecting a value of a middle tone level is more suitable. In this embodiment, M=130 is selected as an example.

In step S1511, the halftone processing unit 106 checks the phase difference of patterns A and B. In other words, the halftone processing unit 106 calculates a cross spectrum for dot arrangements A and B for the Mth tone level that were created by the processing of loop 1. In step S1512, the halftone processing unit 106 determines according to the calculation results in step S1511 whether or not the following two conditions are satisfied: (1) there is reverse phase for the low-frequency component that can be easily detected, and (2) there is no special phase relationship and no correlation for the high-frequency component. The specific procedure for this determination method will be described later. In step S1512, when it is determined that the calculation results satisfy the judgment conditions, processing moves to step S1513, and the halftone processing unit 106, by a method that will be described later, changes the center height of the unit potential. Next, in step S1514, the halftone processing unit 106 discards the dot arrangements, threshold matrices and potential maps for g=253 to M that have been created up to this point, resets processing to that at the point after processing of step S1506 ended. Next, after processing of loop 1 is performed again for g=253 to M, processing moves to the judgment process in steps S1511 and S1512. In step S1512, when it is determined that the calculation results satisfy the judgment conditions, it is possible to create the desired threshold matrices, so the halftone processing unit 106 moves to loop 2 comprising steps S1515 to S1518, and performs processing for the remaining tone level values g=(M−1) to 1.

The processing of steps S1516 and S1517 can be performed the same as the processing of steps S1508 and S1509 in loop 1 (FIG. 16).

The detail procedure for checking the phase difference in step S1511, and changing the unit potentials in step S1513 will be described below.

Method for Changing the Apex Height of the Unit Potentials

Figure 17:
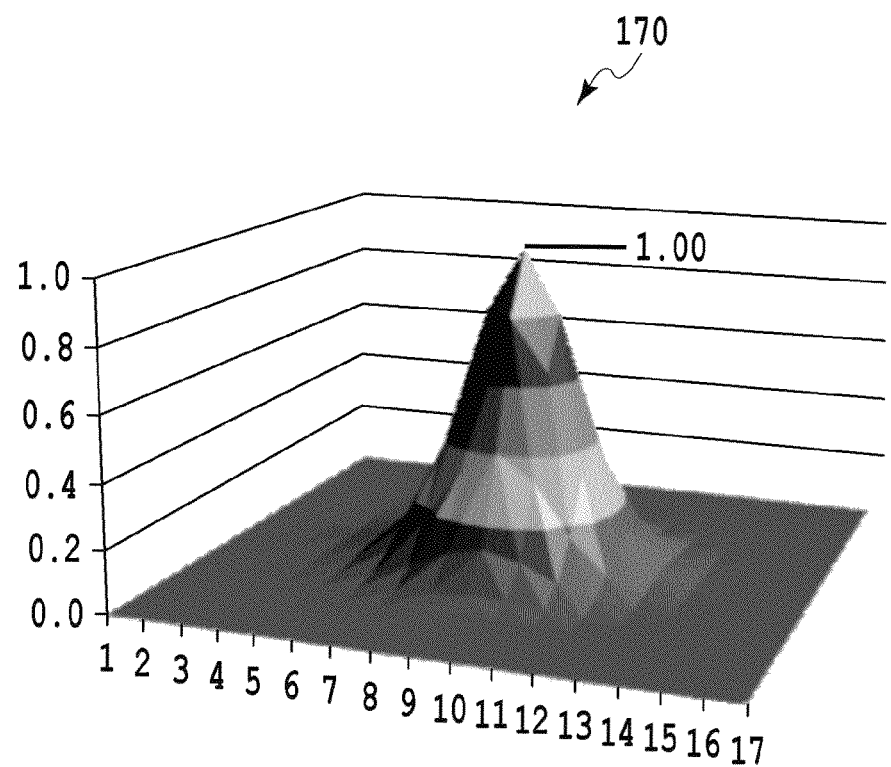
FIG. 17 is a drawing that illustrates a unit potential in an embodiment.

First, in regard to changing the unit potentials in step S1513, in this embodiment the use of unit potentials as illustrated in FIG. 17 will be explained.

FIGS. 18A to 18E illustrate the phase difference between dot arrangement A and dot arrangement B when only the value of the apex of the unit potential 170 is changed a little from 1.00. As illustrated in FIGS. 18A to 18E, as the value of the apex of a unit potential is changed from being small to large, the phase difference in the high-frequency areas continuously passes from an in-phase state through a random state, and to a reverse phase state. Therefore, in the check of the phase difference in step 1511, when the high-frequency phase is reverse phase, the unit potential is updated in step S1513 so that the value of the apex becomes smaller, and when the high-frequency phase is in-phase, the value of the apex is changed to become larger. Changing the value of the apex of the unit potential in this way means changing the weighting of a pixel that corresponds to a black dot. When doing this, the weighting of surrounding pixels to which weighting was given according to the location of a black dot is not changed.

The new phase that appears here called the high-frequency in-phase state is a state in which before and after a position shift is opposite that of the high-frequency reverse phase that was explained with reference to FIG. 11. In the high-frequency in-phase state, the peaks and valleys of the density distributions by the first nozzle group and second nozzle group when there is no position shift overlap, and the peaks and valleys of the density distributions by the first nozzle group and second nozzle group when there is position shift are complementary. Therefore, from the aspect of robustness, the state in which the dot arrangements are high-frequency in-phase is not a preferred state for the dot arrangements.

Method for Checking the Phase Difference

Figure 19:
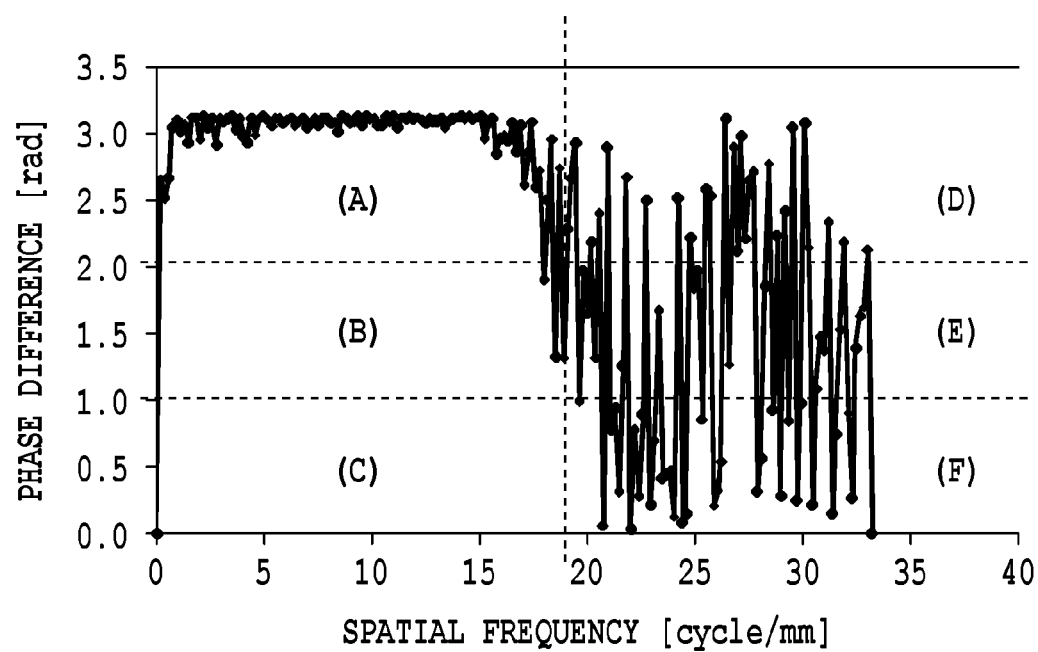
FIG. 19 is a drawing that schematically illustrates the shape of the phase difference characteristic that is used in a phase difference check in an embodiment.

The procedure for checking the phase difference in step S1511 can be based on the explanation above. That is, the checking procedure should determine which of the shapes of the phase differences illustrated in FIGS. 18A to 18E the phase difference characteristic of the dot arrangements A and B correspond to. For example, the halftone processing unit 106 can divide the area into six areas (A) to (F) according to the frequency band and phase difference as illustrated in FIG. 19, and investigate the distribution frequency of the plot in each area. In the case of having robustness in the low-frequency reverse phase and high-frequency random phase, the calculation results of the phase difference should show a plot that has concentrated distribution in area (A), and at high frequency, the plot should be uniformly distributed in (D), (E) and (F). On the other hand, when the height of the apex of the unit potential is less than 1.00, the distribution of the plot is concentrated in (A) and (F), and when greater the distribution of the plot is concentrated in (A) and (D). Therefore, the halftone processing unit 106 updates the apex height so as to be higher when the apex height of the unit potential is less than 1.00, and so as to be lower when the apex height is greater than 1.00. As the update amount of the updated apex height gradually becomes smaller each time the update process in step S1513 is repeated, it becomes possible to find the most suitable apex height when performing the check in step S1511. In order to set the quality of the threshold matrices, it is also possible for the user to adjust the conditions according to the conditions of the check in step S1511, or it is also possible to change the check procedure itself.

Expansion of the Creation Method

In another embodiment, in regard to changing the unit potential, besides the embodiment above, it is also possible to change the width of the unit potential, or to change the height of a portion other than the apex of the unit potential. However, a feature of the procedure to update the apex height of the unit potentials is being able to control the robustness without affecting the formation process of the dot arrangements much, so this can be said to be a more preferable embodiment. Generally, when the shape of the unit potential is changed, the weighting given to surrounding pixels also changes, so the formation of the dot arrangement changes unintentionally, and it was difficult to reach a suitable dot arrangement formation. However, in a method in which only the apex height is changed, when unit potentials have been found for forming suitable dot arrangements, the formation for the dot arrangements will be maintained. This is because, in actuality, the apex height of the unit potentials, which is the position where a black dot is placed, does not largely affect the formation of the dot arrangements. In the creation of a single threshold matrix (for example, single matrixA) based on this embodiment, there is no other black dot that is placed on a pixel where a black dot is already placed, so the apex height of the unit potential does not affect the dot formation. On the other hand, in this embodiment, only when determining whether or not to place a black dot in the one matrix at a position where a black dot is placed in only the other of the plural threshold matrices (a black dot is in matrixB and not in matrixA) is the apex height of the unit potential affected. Therefore, the overall effect of the apex height of the potential on the dot formation is small. However, even though the effect on the dot formation is small, as illustrated in FIGS. 18A to 18E, the point that the apex height of the unit potentials has a clear correlation with the robustness is important. Knowing that the one-dimensional amount of the unit potential is a parameter for robustness largely contributes to the advantage of the present invention in that it is possible to very easily create suitable dot arrangements or threshold matrices, and can be freely executed when setting the phase difference check.

Here, other knowledge obtained by the applicants about the method for creating threshold matrices of this embodiment will be described. It was confirmed that the change of the apex height of the unit potentials not only occurred for the Gaussian function type potentials that were employed in this embodiment, but similarly occurred for other function shapes for giving weighting as well. In conjunction with this, the expression "changing the apex height" of the unit potentials was partially used rather than the potential shape above. However, the "apex height" actually means the height at a position of a black dot that is being focused on (center of the unit potential), and is understood to not always be just the maximum value of a unit potential. Moreover, as is clear from the method for creating threshold matrices, processing in this embodiment is performed without distinction between the vertical and horizontal directions, so is also effective for position shift in the sub scanning direction (conveyance direction of the paper) as well.

It is known that the boundary between low frequency and high frequency is affected by the shape (width and the like) of the unit potentials, and the coefficients $\alpha$ and $\beta$ of the potential evaluation. For example, when $\sigma=4.0$ in a Gaussian function type potential, the boundary between the reverse phase and no correlation state shifts toward the low-frequency side, and becomes a frequency that is about half that of this embodiment (approximately 10 cycles/mm). Moreover, when α=0 in this creation method, creation is nearly equivalent to the creation of the two non-correlated dot arrangements illustrated in FIG. 10, and the phase difference illustrated in FIG. 13 is not correlated over the entire area. Therefore, when the low-frequency reverse phase condition is not satisfied even though the apex height of the desired potentials is changed, it is possible to change the coefficients α and β. Furthermore, it is also possible to change the shape of the potentials according to evaluation of the image quality. However, in that case, there is a possibility that formation of the dot arrangements will be largely affected.

Figure 20:
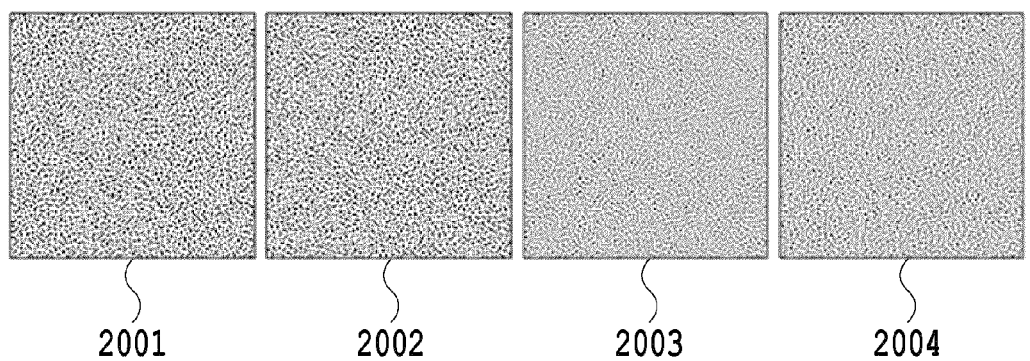
FIG. 20 is a drawing that illustrates the overlapping of dot arrangements by a threshold matrix group that was created by the method of an embodiment.

FIG. 20 illustrates overlapping and combination of dot arrangements by a set of threshold matrices that were created by the method of this embodiment. In FIG. 20, dot arrangements 2001 and 2002 are both single dot arrangements. Dot arrangement 2003 is an overlapping combination of dot arrangement 2001 and dot arrangement 2002 with no position shift. Dot arrangement 2004 is an overlapping combination of dot arrangement 2002 that has shift one pixel to the left and dot arrangement 2001. In this embodiment, dot arrangements 2001, 2002, 2003 and 2004 all can be said to be good dot arrangements having high dispersion.

Figure 21:
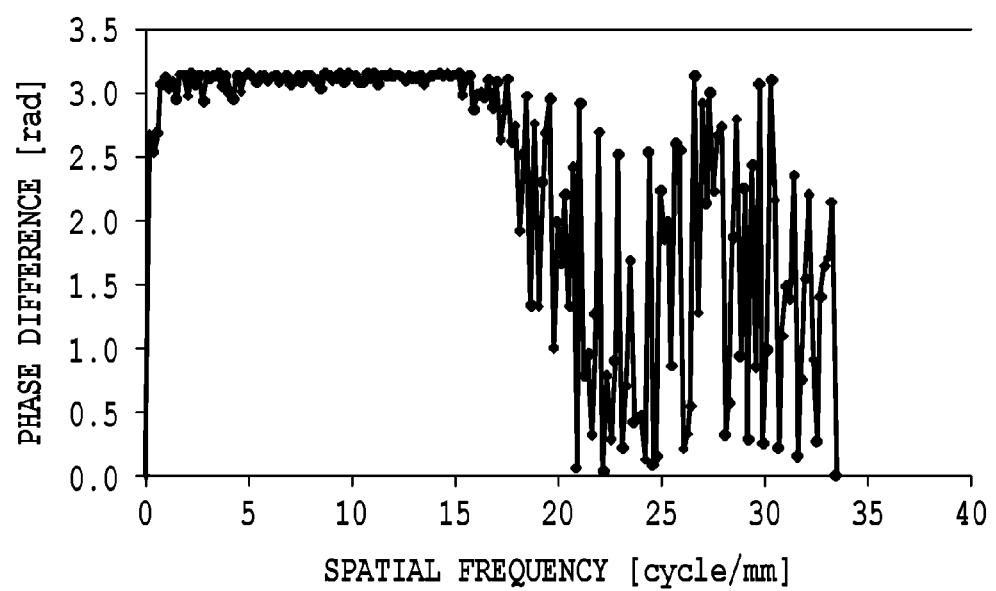
FIG. 21 is a drawing that illustrates the phase difference of dot arrangements by a threshold matrix group that was created by the method of an embodiment.

FIG. 21 illustrates the phase difference of dot arrangements by the set of threshold matrices that were created by the method of this embodiment. As illustrated in FIG. 21, it can be seen that the dot arrangements that were created by the method of this embodiment satisfy the two conditions above of (1) being reverse phase in the low-frequency component that can be visually and easily detected, and (2) having no specific phase relationship and no correlation in the high-frequency component. According to this embodiment, by setting dot arrangements for each nozzle group using such the set of threshold matrices, it is possible to form high-quality images that are robust against phase shift without having to perform adaptive processing during image formation.

Second Embodiment

Robust Threshold Matrices with Randomness Eliminated from the Frequency Characteristics In the embodiment described above, a method for creating a set of two threshold matrices, both having phase difference characteristics of a low-frequency reverse phase and high-frequency no correlation was explained. However, the set of threshold matrices used in the present invention is not limited to these. The applicants found that by appropriately setting the unit potentials used, it is possible to create a set of threshold matrices that can improve the robustness against position shift and improve graininess even without the phase difference characteristics being low-frequency reverse phase and high-frequency no correlation. In this embodiment, a specific example of the frequency characteristics of such a set of threshold matrices, the reason for being able to improve graininess, the reason that lightness fluctuation is suppressed, the detailed shape of the potentials, and the characteristics of that shape will be explained.

Figure 22:
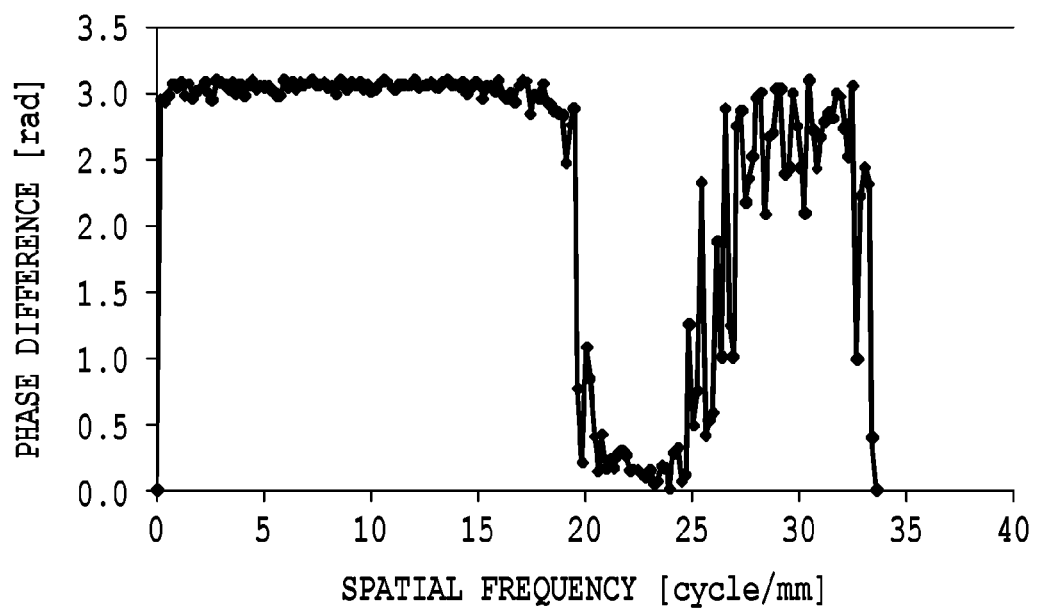
FIG. 22 is a drawing that illustrates the phase difference of dot arrangements by a threshold matrix group that was created by the method of a second embodiment.

FIG. 22 illustrates an example of the phase difference frequency characteristics of such the set of threshold matrices. As illustrated in FIG. 22, the plot illustrating the phase difference of the dot arrangements is distributed in the reverse phase band in the low-frequency area (approximately 20 cycles/mm or less), and is distributed in the in-phase band in the middle frequency area (approximately 20 to 24 cycles/mm). Similarly, the plot is distributed in the reverse-phase band in the high-frequency area (approximately 24 cycles/mm or more). However, the low frequency, middle frequency and high frequency referred to here, as in the first embodiment, represent a relative relationship, and do not mean absolute values. Here, for convenience, a phase difference of 0 to $\pi/3$ is called the in-phase band, and a phase difference of $2\pi/3$ to $\pi$ is called the reverse-phase band. In this second embodiment, it can be seen that when compared with the random values between the phase difference of 0 to $\pi$ in the high-frequency band in the first embodiment, for each of the three frequency divisions, the phase difference becomes a limited value, and clearly has a different distribution. The applicants found that a set of threshold matrices having this kind of phase difference distribution were able to suppress degradation of graininess, and can have a robust lightness fluctuation characteristic against position shift.

These characteristics are explained below. First, a reduction of degradation of graininess with respect to position shift, is the same as the feature of the low-frequency reverse phase in the first embodiment. The reason that by using the set of threshold matrices of this embodiment it is possible to improve the graininess more than the set of low-frequency reverse phase and high-frequency no correlation threshold matrices of the first embodiment is as explained below. The no correlation in the high-frequency area, or in other words, a random state, means that there is localized unevenness in the two overlapping combined two dot arrangements. On the other hand, the frequency characteristic of this embodiment in which the in-phase or reverse-phase phase difference in all frequency areas is controlled and randomness is eliminated means that in terms of frequency, localized dot overlap is also controlled. Therefore, the frequency characteristic in this embodiment is considered to be capable of reducing graininess more than in the first embodiment because there is little localized unevenness.

Furthermore, the reason that the frequency characteristic is robust against lightness fluctuation due to position shift as in the low-frequency reverse phase and high-frequency no correlation frequency characteristics of the first embodiment will be explained. Generally, as was explained in the first embodiment, by having a balance when a position shift occurs, by new dot overlap occurring and existing dot overlap being reduced, the number of overall dot overlap is kept constant. However, the frequency characteristic of this embodiment is more complex than the frequency characteristic of the first embodiment, so will be explained in detail below.

The dot overlap in the frequency space will be considered. In the expression of frequency characteristics of the phase difference illustrated in FIG. 12 (this is the same in FIG. 13, FIG. 21 and FIG. 22), when the phase difference in the spatial frequency ω is taken to be $(\phi)(\omega)$, the component $D(\omega)$ of the spatial frequency ω that includes dot overlap is presumed to be $D(\omega)=\cos(\phi(\omega))$. Here, the correlation of the dot overlap when the dots in actual space are viewed in a frequency space is expressed by $D(\omega)$. For example, at the spatial frequency ω, in the in-phase state, or in other words, when $(\phi)(\omega)=0$, $D(\omega)=1$, or in other words, $D(\omega)$ is 1 with respect to the dot overlap. On the other hand, in the reverse-phase state, or when $(\phi)(\omega)=\pi$, $D(\omega)=-1$, or in other words, $D(\omega)$ is $-1$ with respect to the dot exclusion state. In addition, this means that the component $D(\omega)$ in the spatial frequency ω of dot overlap is presumed to continuously change as a sine curve due to the phase difference of both dots. There is no special meaning in the value of $D(\omega)$ itself from $-1$ to 1, however, the change of that value expresses the relative change in the component of dot overlap when viewed in the spatial frequency ω. Next, when the spectrum of the spatial frequency ω is taken to be P(ω), the integral over the entire frequency range of P(ω)×D(ω) is considered to represent the overall dot overlap component in this state. In other words, the dot overlap component D_ALL(0) when there is no position shift is expressed by the following equation.

$$D\_ALL(0) = \int \{P(\omega) \times D(\omega)\} d\omega$$

Here, D_ALL(0) that takes into consideration the dot overlap component for the entire frequency range can be considered to be the correlation between the dot overlap of patterns in the original actual space.

Next, the case in which a certain position shift x occurred from this state will be considered. When a position shift x occurs, the overlapping of the dot patterns changes, and the degree of dot overlap also changes. This change, when viewed from frequency space should appear as a change in phase that is smaller in the low-frequency component, and larger in the high-frequency component. Therefore, the dot overlap component D'(ω) when a position shift x occurs is expressed by the following equation.

$$D'(\omega, x) = \{\cos(\phi)(\omega) + (2\pi x\omega/L)) + \cos(\phi(\omega) - (2\pi x\omega/L))\}/2$$

The phase further changes due to position shift x with respect to the initial phase difference (φ)(ω) when there is no shift, and the phase that was in-phase (0) continuously changes toward the reverse phase (π), and the phase that was reverse phase (π) continuously changes toward in-phase (0). The inclusion of the terms +(2πxω/L) and −(2πxω/L) that have different signs indicates that there is phase difference that moves in the direction of becoming smaller and phase difference that moves in the direction of becoming larger due to position shift. Here, the average that considers that these phase differences exist in the same amount is taken to be D' (ω, x). L is a constant that connects the frequency and the amount of position shift, and, when the amount of position shift is x=L, for example, the phase at ω=1 shifts 2π, and at ω=2, shifts 4π. In other words, the amount of phase change becomes larger, the higher the high-frequency component is.

Based on the above, the overall dot overlap component D_ALL(x) when there is position shift x is expressed by the following equation.

$$D\_ALL(x) = \int \{P(\omega) \times D'(\omega)\} d\omega$$

It should be noted that D_ALL(0) is equivalent to D_ALL (x) when x=0.

D_ALL(x) that is set in this way expresses the dot overlap component for the entire dot pattern. Therefore, this indicates that when the change in the value of D_ALL (x) is small with respect to the change in the position shift x, it becomes difficult for a fluctuation in lightness with respect to the position shift of dots to occur.

FIGS. 23A to 23D illustrate the actual results of calculation of D_ALL(x). FIGS. 23A to 23D, as examples, graphically illustrate the calculated results of D_ALL(x) (right side) for the case when position shift x changes within the range of 2 dots on the image from 0, in contrast to several of the phase difference frequency characteristics explained up to this point (left side). FIG. 23A illustrates the calculated results related to the overall frequency reverse phase illustrated in FIG. 12 for the case that was described in the explanation related to the first embodiment in which a fluctuation in lightness occurred due to position shift. FIG. 23B illustrates the calculated results related to the overall frequency no correlation state illustrated in FIG. 13 for the case that was described in the explanation related to the first embodiment in which hardly any fluctuation in lightness occurred even though the graininess was not good. FIG. 23C illustrates the calculation results related to the frequency characteristics in the first embodiment illustrated in FIG. 21 for which it was already described that lightness fluctuation could be reduced. FIG. 23D illustrates the calculation results related to the frequency characteristics of this embodiment illustrated in FIG. 22.

As illustrated in FIGS. 23A to 23D, in the case of FIG. 23A, D_ALL only changes a little, and is 0.3 for a 1 dot shift, where in FIG. 23B, FIG. 23C and FIG. 23D it can be seen that there is hardly any change at all. Therefore, it can be seen that the characteristics of a fluctuation in lightness can be explained by D_ALL(x) from the calculation results of FIGS. 23A, 23B and 23C. Furthermore, from the calculation results of FIG. 23D, the phase difference characteristics of this embodiment can confirm that, as in (c) of the first embodiment, fluctuation in lightness does not easily occur.

In other words, it can be said that the following things are important for robustness. In order to avoid degradation of graininess and degradation of graininess due to position shift, it is preferred that the phase difference characteristic be low-frequency reverse phase. On the other hand, in order to reduce lightness fluctuation due to position shift, it is preferred that the phase difference characteristic be such that there is a balance in the degree of dot overlap before and after a position shift. Furthermore, in order to improve graininess, it is preferred that no correlation (randomness) phase difference characteristic be eliminated. An example of satisfying these conditions is the phase difference characteristic of this embodiment (FIG. 22), and in order to meet these demands, there is a feature that the in-phase band is continuously in the middle frequency area. A set of threshold matrices for an example of dot patterns having this kind of phase difference characteristic can be created using unit potentials as described below.

The detailed shape of a unit potential P(x, y) that creates a pattern having the above frequency characteristic is based on the following. Here, $r = \sqrt{(x^{02} + y^{02})}$.

$$P(x, y) = 1.0125 \text{ (when } r = 0\text{)}$$
$$= 1.19 - 0.406r \text{ (when } r \leq 2\text{)}$$
$$= 2.73 \exp(-r) \text{ (when } 2 < r \leq 10\text{)}$$
$$= 0 \text{ (other times)}$$

The value r=0 is the result when the value is adjusted based on the first embodiment. The following reason is feasible as the reason that it is possible to achieve the frequency characteristic in which the no-correlation characteristic is eliminated as in this embodiment with this unit potential.

Figure 24:
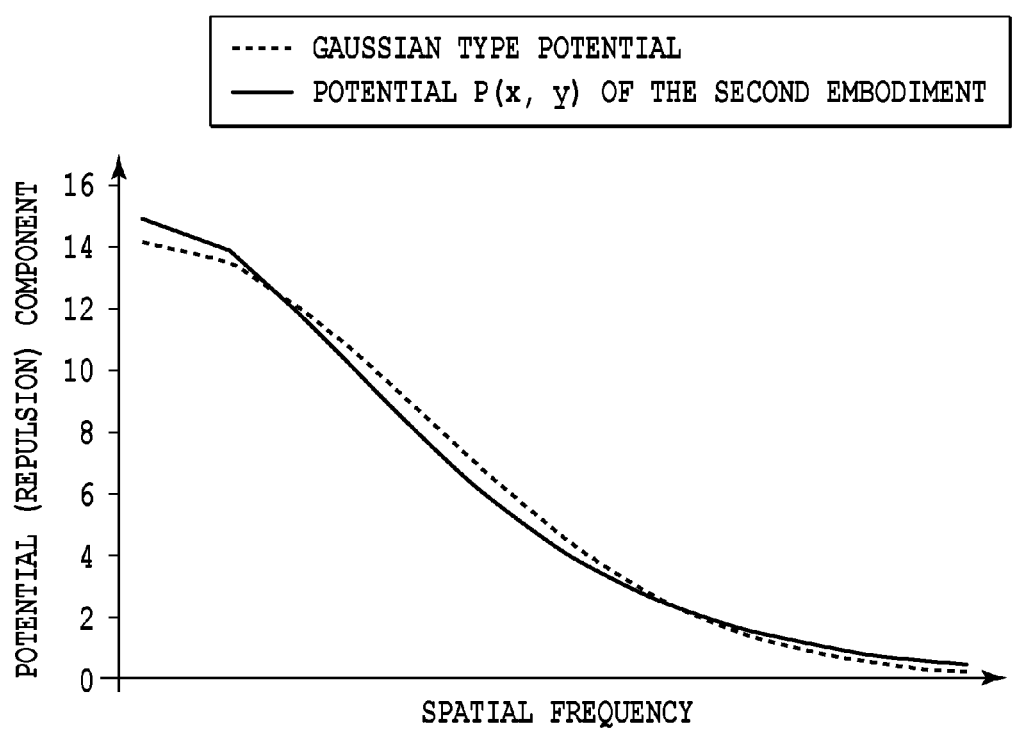
FIG. 24 is a drawing that illustrates the frequency component of the unit potential that is used in the first embodiment and second embodiment.

FIG. 24 illustrates the frequency component of a unit potentials P(x, y) that is used in this embodiment with the solid line, and illustrates the frequency component of a Gaussian type unit potential that is used in the first embodiment with the dashed line. The direct flow component is simply a constant factor and has no meaning, so is omitted from the drawing.

Unit potentials, as described in the first embodiment, can be treated as something that expresses the repulsion of black dots. As can be seen from the results of the first embodiment, with a Gaussian type unit potential, dot overlap in the high-frequency component occurs randomly. In other words, the values of the Gaussian function are such that the positions where dots can be placed easily are equally balanced with respect to distance. On the other hand, when compared with the Gaussian type unit potentials, the unit potentials in this embodiment have strength or weakness for each frequency. Therefore, compared to the Gaussian type unit potentials, at which positions dots can be placed easily and at which positions dots cannot be placed easily appears, and can be considered to be connected to the dot arrangements being controlled. Based on this knowledge, compared with the Gaussian type unit potentials, by changing the strength or weakness of the repulsion for each frequency, the in-phase band can be divided into two or more frequency divisions, and it is also possible to find unit potentials that balance dot overlap different from this embodiment. In that case, after setting the form of the base of the unit potentials, the overall unit potentials for which suitable phase difference occurs should be set by the creation method of the first embodiment that changes the apex height.

Third Embodiment

Variation in the Creation Order of Threshold Matrices

In the embodiments described above, when generating threshold matrices, dot arrangements were made starting from bright tone levels, and processing proceeded in order toward dark tone levels. However, the order for creating tone levels is not limited to this. For example, it is possible to start in the opposite order from dark tone levels, or, it is also possible to start making dot arrangements from middle tone levels, and for processing to proceed toward bright tone levels or toward dark tone levels. In the case of starting from the middle tone level value, the middle tone level value (128th tone level, or the like) is used for the initial dot arrangement, and threshold matrices are created by adding black dots toward dark tone levels as in the first embodiment, and by removing black dots that have the maximum potential value in the dot arrangement going in the direction toward brighter tone levels. The unit potentials can be updated by checking the phase difference at tone level values near the middle according to the processing flow of the first embodiment.

Moreover, in the first embodiment, black dots were handled in consideration of potential, however, it is possible to reverse how black and white dots are handled.

Furthermore, it is also possible to provide a step for searching for new dot arrangements as initial dot arrangements that are more suitable than the prepared initial dot arrangements. In other words, after preparing arbitrary initial dot arrangements, the halftone processing unit 106 creates corresponding potential maps. Then, the halftone processing unit 106 checks the phase difference of the initial dot arrangements, and when as a result it is found that the initial dot arrangements do not have robust frequency characteristics, the halftone processing unit 106 performs processing of the initial dot arrangements to change the dot arrangements while maintaining the number of dots. As this processing to change the dot arrangements, it is possible to use various kinds of known technology such as genetic algorithms, a para-annealing method, a search method that is employed when trying to move the dots to nearby pixels to see whether the dot arrangement becomes better, and the like. After it is determined that sufficient change has been performed, the halftone processing unit 106 calculates the phase difference again, and when there still is no robust frequency characteristic, changes the height of the unit potentials as described in the first embodiment, and changes the dot arrangements again. This time, when it is found that there is a robust frequency characteristic, the dot arrangements after the change are used as new initial dot arrangements, and processing proceeds toward a brighter tone level or a darker tone level. In this way, threshold dot matrices that create a robust dot arrangement while maintaining the characteristic of the dot arrangements derived from the unit potentials begin to be created from a middle tone level, and can be created efficiently.

As described above, in this embodiment, the halftone processing unit 106 further expands the process for adding dots of the first embodiment, and corrects the dot arrangements of the given dot arrangements by adding dots, removing dots and changing the positions of dots.

Fourth Embodiment

Alternative Process for Checking Robustness

In the embodiments above, as evaluation of the change in image quality due to a position shift in the created dot arrangements, an example was described in which the spatial frequency area was divided as in FIG. 19, and robustness was checked from the frequency at which the plotted points appear in each spatial frequency area. Confirming the robustness can also be performed by changing the method used for dividing the area, however, is not limited to a method such as this of dividing the area. For example, it is also possible to divide the horizontal axis into several frequency divisions having the same length and find the dispersion in each division. In that case, the conditions for confirming robustness are that the dispersion in each of the divisions in the low-frequency area is less than a specified value, and in the high-frequency area is greater than a specified value. Moreover, it is also possible to determine the robustness by finding the average value in the low-frequency area and in the high-frequency area. In that case, the conditions for confirming robustness are that the average value in the low-frequency area is greater than a specified value, and the average value in the high-frequency area is included in a specified middle range.

When the boundary area between the low-frequency area and the high-frequency area is not known in advance, the apex height of the unit potentials can be started, for example from a small value (0.98) as illustrated in FIG. 18A, and then the frequency at which the value greatly changes is detected, and that frequency can be taken to be the boundary.

Processes that does not go Through Frequency Conversion

As explained in the first embodiment, it was seen that the behavior of the phase difference when the apex height of a unit potential is changed is as illustrated in FIGS. 18A to 18E. Therefore, more simply, the halftone processing unit 106 can create an overlapped pattern by slightly shifting the two created dot arrangements (one pixel or the like), and then check the degree of dot overlap. For example, the condition for confirming robustness is taken to be that the number of pixels with no dots (white pixels) does not greatly change with respect to the tone level value (the change is equal to or less than a specified threshold value). In this case, when the number of white pixels increases when the two dot arrangements are shifted and overlapped, the apex height of the unit potentials can be changed in the lowering direction, and when the number of white pixels decreases, the apex height of the unit potentials can be changed in the raising direction.

Changing Threshold Matrices Based on Sensed Information from Actual Printing

Furthermore, in the embodiments described above, a method of creating threshold matrices before printing was described, however, it is also possible to check robustness of an actually created image, and change the threshold matrices.

In order for this, it is possible to provide an image sensor in the image formation apparatus. The image formation apparatus can use a method for creating threshold matrices in which the image sensor of the image formation apparatus reads a formed image, and based on that result, changes the unit potentials. In this case, the image formation apparatus can create threshold matrices that correspond to various different kinds of position shifts for each individual image formation apparatus.

Fifth Embodiment

Number of Matrices in the Set of Threshold Matrices

In the embodiments described above, examples where creating one set of two threshold matrices is explained, however, in this embodiment, the number of threshold matrices in one set is not limited to two. In other words, even when the number of threshold matrices in one set is three or more, the halftone processing unit 106 can create a set of threshold matrices using the same procedure as was explained in the embodiments described above.

In this embodiment, when calculating the phase difference, it is possible to take into consideration the combination of two threshold matrices selected from a created set of threshold matrices, or it is possible to take into consideration a combination of two threshold matrices based on a specified weighting from a created set of threshold matrices. Moreover, a third dot arrangement can be evaluated with respect to a dot arrangement that is an overlapping combination of a first dot arrangement and a second dot arrangement. In judgment in the case in which there are three or more threshold matrices, the judgment conditions can be set by the user so as to be able to be applied to various embodiments.

Furthermore, in the flowchart of the first embodiment, when creating the dot arrangements, the number of black dots NA required for expressing a certain tone level value were all added to pattern A, after which processing then moved to processing for arranging dots in pattern B. However, in order to further maintain fairness of the threshold matrices to be created, the patterns for which dot arrangement processing is performed can be switched every time a fewer number of dots. In an extreme case, dot arrangement processing can be performed by switching the patterns in an alternating manner between pattern A, pattern B, pattern A, pattern B, . . . , one dot at a time. The same can also be performed in an embodiment in which a set of three or more threshold matrices is created.

Sixth Embodiment

Variation of Multipath Printing that can be Applied (Multiple-Array Head and the Like)

An embodiment can also be considered in which multipath printing that is different than in the embodiments described above is used. For example, the present invention can also be applied to multipath printing that limits the main scanning direction such that, instead of forming dots when moving the printing head in a back-and-forth movement, the formation of dots is performed only when the printing head moves in a single direction, or the like. Moreover, the present invention can also be applied to multipath printing that is controlled so that a dot arrangement is formed by the first and second nozzle groups according to threshold matrix A when the printing head moves in one direction, and a dot arrangement is formed by both nozzle groups according to threshold matrix B when the printing head moves in the reverse direction. With this kind of control as well, an image is finally formed that is the result of overlapping dot arrangements on the entire recording medium by using threshold matrices A and B.

Figure 25:
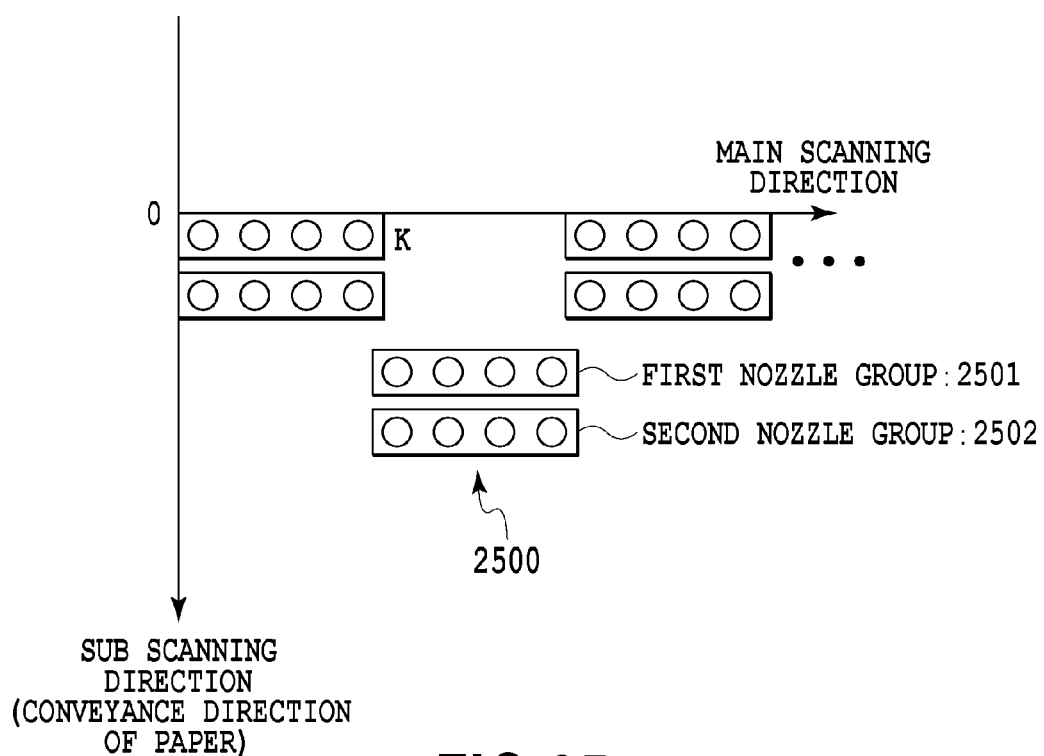
FIG. 25 is a drawing that schematically illustrates an example of the configuration of a printing head that has plural printing nozzle arrays.

In this embodiment, a multipath printing method can be used in which, instead of using the printing head illustrated in FIG. 7, a printing head having plural printing nozzle arrays 2500 as illustrated in FIG. 25 is used. Generally, configuration having this kind of plural printing nozzle arrays is called multiple-array head configuration. In FIG. 25, configuration is illustrated in which a first nozzle group 2501 is located on the top side of a printing nozzle array 2500, and a second nozzle array 2502 is located on the bottom side of the printing nozzle array 2500. In this embodiment, the printing nozzle array 2500 in the main scanning direction is connected, and as the paper (recording medium) is conveyed, an image is formed by the printing nozzle array 500 that is arranged in a houndstooth shape printing plural times. In the example in FIG. 25, the reason that the horizontal axis is taken to be the main scanning direction, is to clarify the configuration when compared with the configuration of the printing head illustrated in FIG. 6 and FIG. 7. Therefore, this does not mean that the printing head having the form illustrated in FIG. 25 always has the form of scanning in the main scanning direction illustrated in the figure. In this embodiment as well, the result using threshold matrix A can be applied to the first nozzle group 2501 and the result using the threshold matrix B can be applied to the second nozzle group 2502.

In any of the embodiments having a printing head as illustrated in FIG. 7 and FIG. 25, the connection between the nozzle groups may appear in the formed image as line-shaped noise, and a so-called banding phenomenon may become obvious. Known technology for handling this banding phenomenon can be used in combination with the methods explained in the embodiments above.

Seventh Embodiment

Modification Corresponding to Multiple-Array Head Array Configuration in which Black Dots Cannot be Intentionally Formed on Black Dots by Plural Nozzle Groups When a multiple-array head is used as in the sixth embodiment, it is possible to use a method for forming an image at high speed by dividing the image data among each nozzle group. FIGS. 26A to 26D explain an example of a printing method by a printer having plural nozzle arrays per color. In order to simply explain the printing method, FIGS. 26A to 26D illustrate only a set of printing nozzles for the color black (K), however, in actuality, configuration is used in which plural sets of printing nozzle arrays are arranged in a houndstooth shape (see FIG. 25).

For example, in the case of forming an image by using a printing nozzle array having two arrays and conveying the recording medium once, the first printing nozzle array forms an image corresponding to odd rows 1, 3 and 5, and the second printing nozzle array forms an image corresponding to even rows 0, 2 and 4.

FIG. 26A schematically illustrates a printing head having two printing nozzle arrays, or in other words, having a printing nozzle array K1 and printing nozzle array K2. In order to simplify the explanation, only eight nozzles are illustrated in each printing nozzle array, with the nozzles of the printing nozzle array K1 being indicted with coarse hatching, and the nozzles of printing nozzle array K2 being indicated with fine hatching. This is just for convenience of the explanation, and does not indicate the color of the ink that is ejected from the nozzles, and does not indicate the shade of the ink. The same is true for FIG. 27.

FIG. 26B and FIG. 26C illustrate the positions on the recording medium where dots (ink drops) are ejected corresponding to the printing nozzle array K1 and printing nozzle array K2. The areas that are represented using different hatching indicate the position of pixels that are formed using each of the printing nozzle arrays. FIG. 26D schematically illustrates an example of a dot pattern (when all dots are printed) that is formed at this time. The number of nozzle arrays and the positions of pixels that are formed by the nozzle arrays are not limited to the example above.

With this kind of method, it is possible to obtain the effect of increased speed of image formation, a reduction of bleeding and unevenness and the like. Particularly, in an ultra high-speed inkjet image formation apparatus that prints and outputs A4 size recording media at several 1000 ppm (number of pages output per minute), a method such as described above that uses a multi-array head is effective in increasing the printing speed. The upper limit of the conveyance speed of the recording medium is set according to the upper limit of the drive frequency of the printing elements and the resolution of the formed image, however, by dividing image data among plural printing element arrays, it becomes possible to increase the upper limit of the conveyance speed by the number of printing element arrays, and to obtain high-speed image formation.

However, in configuration that uses a multi-array head, operation to newly form black dots over black dots that have already been formed by plural nozzle groups is not performed, so as schematically illustrated in FIG. 14, it is not possible to have a certain amount of dot overlap in a state in which there is no position shift. In the first embodiment, a robust arrangement was created by changing the center height of unit potentials (S1513), however, in configuration as illustrated in FIGS. 26A to 26D in which it is not possible to form overlapping dots, the dot arrangement that is formed does not change even though the center height is changed, so the method of the first embodiment cannot be used. This is because changing the center height only affects whether or not dots will be placed in a matrix at positions corresponding to positions where black dots are placed only in the other threshold matrix.

Figure 27:
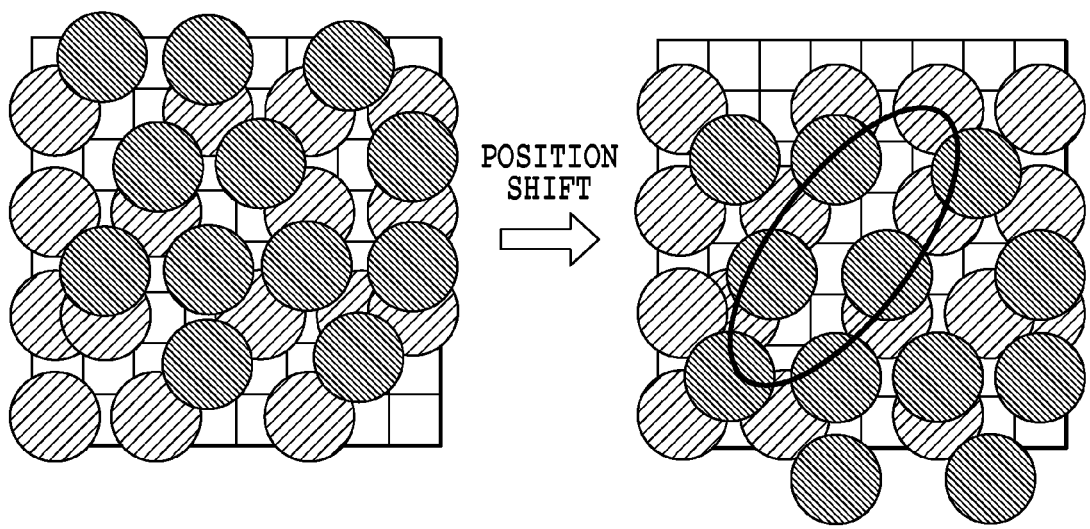
FIG. 27 is a schematic drawing that illustrates dot arrangements when a position shift occurred in a seventh embodiment.

In this embodiment, a method of changing the coefficients α and β of the potential evaluation equation (α×PotentialS+β×PotentialA) for setting positions where to add black dots is used as another method for adjusting robustness. To describe the effect that the coefficients α and β have on the dot arrangements, when α is a large value, the formed image by the first nozzle group and the formed image by the second nozzle group individually have an arrangement with low dispersion, and the overlapped combination of both has an arrangement with high dispersion. In this case, as schematically illustrated in FIG. 27, the overlapped combined image has an arrangement with good graininess when there is no shifting (figure on the left). However, when a position shift occurs, the blank white areas that the formed images by the individual nozzle groups have become obvious as areas that are surrounded by an oval due to that position shift (figure on the right). Therefore, unevenness in sparse and dense areas of dots occurs and the graininess degrades. On the other hand, when the value of α is small, the formed image by the first nozzle group and the formed image by the second nozzle group each have a dot arrangement with high dispersion as illustrated in FIG. 10, and there are few latent blank white areas, so even though a position shift may occur, there are few obvious blank white areas, and there is little degradation of the graininess.

In this way, the difference in the relative size of the coefficients α and β greatly affects the graininess when there is no position shift and the graininess when there is a position shift. As a result of performing evaluation of the graininess to clarify this kind of correlation even more (described later), the following things were found.

Figure 28:
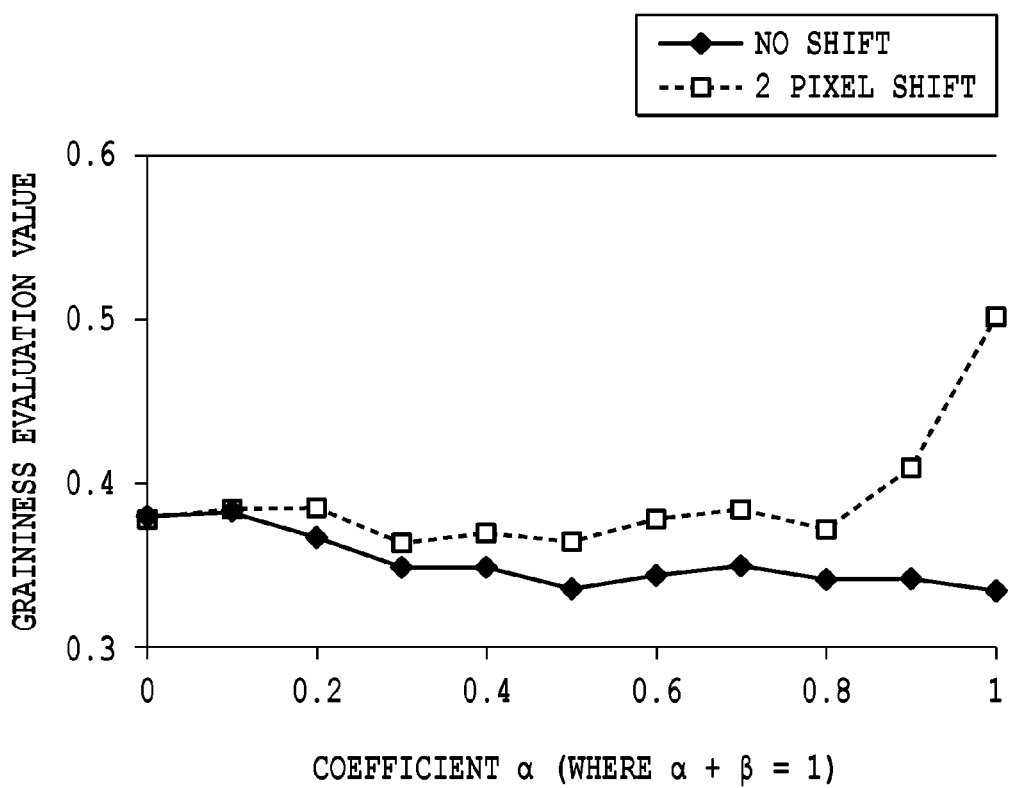
FIG. 28 is a characteristic diagram that illustrates the graininess evaluation values when there is a position shift and no position shift in a seventh embodiment.

FIG. 28 is a drawing illustrating the characteristic when comparing the graininess when there is no position shift and when there is a position shift when the coefficient α (weighting parameter) is changed between 0 and 1 under the condition α+β=1. Here, as the graininess value along the vertical axis becomes smaller, the graininess becomes better. From FIG. 28 two trends can be confirmed. First, the smaller coefficient α is, the smaller the difference between the graininess when there is no position shift (solid line) and the graininess when there is a position shift (dashed line) becomes. Second, the larger the coefficient α is, the better the graininess when there is no position shift becomes. From these trends, it can be said that degradation of the graininess due to a position shift is suppressed the smaller coefficient α is, and on the other hand, the graininess when there is no position shift become better the larger coefficient α is.

From the explanation above, it can be seen that the two trends above are in a trade off relationship when considering suppression of degradation of graininess due to a position shift, and good graininess when there is no position shift. Therefore, in this embodiment, a method for creating a dot pattern is used in which an allowable value for degradation of graininess is set, and the best values for coefficients α and β when there is no position shift are selected from among candidates for which that allowable value is satisfied.

Method for Creating Threshold Matrices

Figure 29:
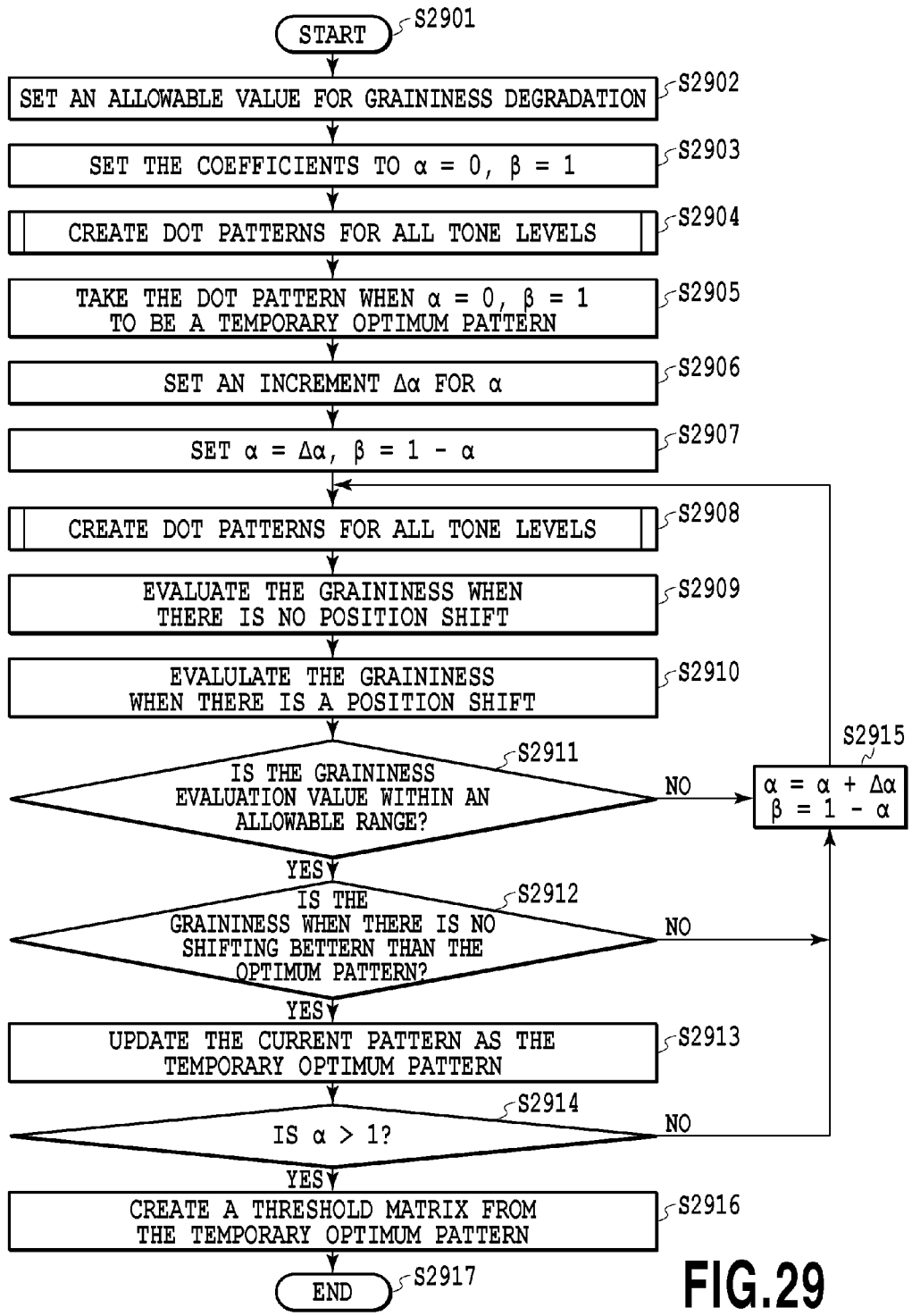
FIG. 29 is a flowchart illustrating the processing contents of a method for creating threshold matrices in a seventh embodiment.
Figure 30:
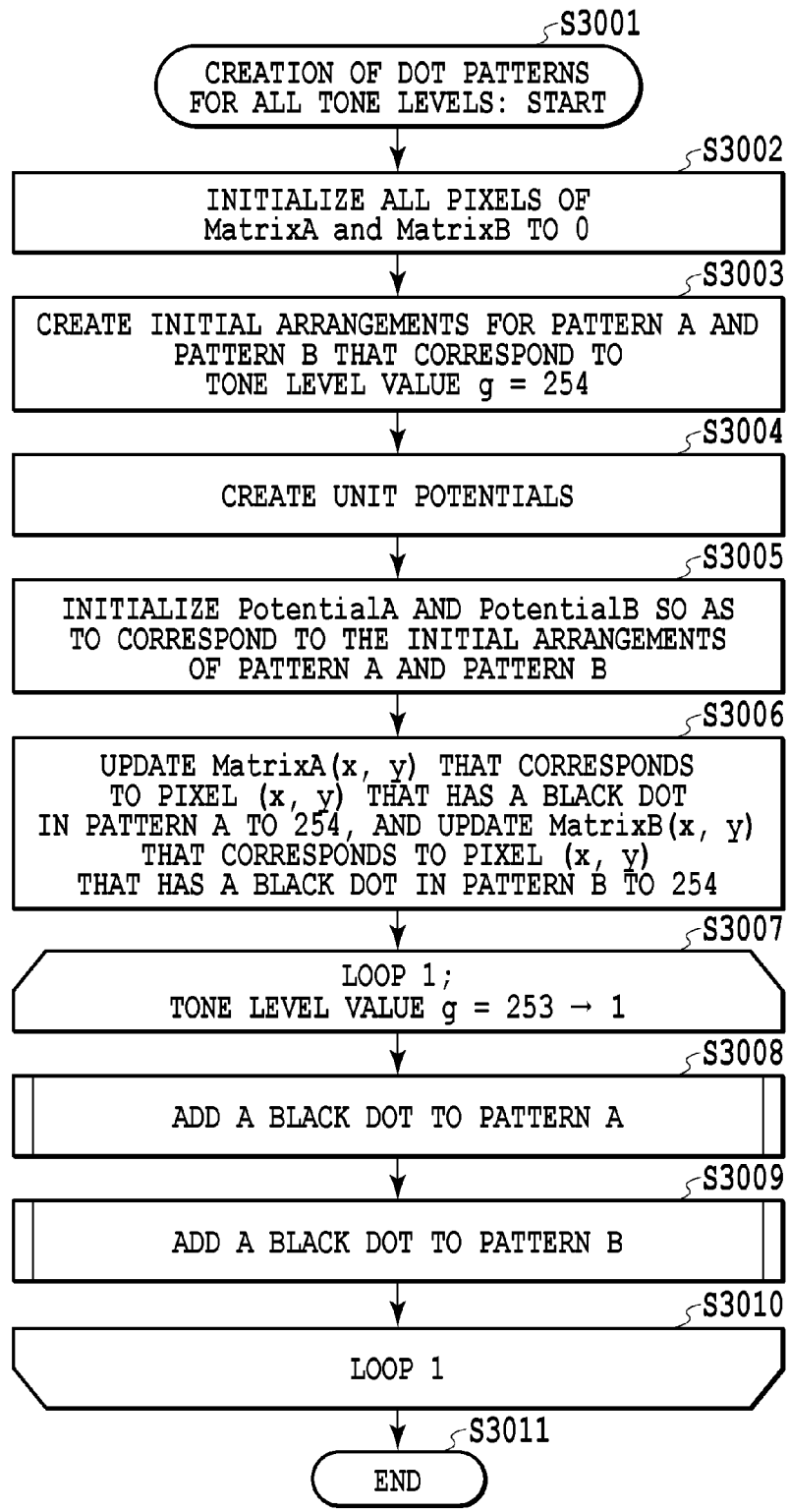
FIG. 30 is a flowchart that illustrates part of the processing contents of the flowchart in FIG. 29.

FIG. 29 and FIG. 30 are flowcharts illustrating the processing contents for a method for creating the threshold matrices of the seventh embodiment. FIG. 30 illustrates in detail the processing contents of step S2904 or step S2908 in FIG. 29. Step S3008 in FIG. 30 corresponds to the processing contents of steps S1601 to S1609 for pattern A in FIG. 16, and step S3009 corresponds to the processing contents of steps S1601 to S1609 for pattern B in FIG. 16. The threshold matrices that are created here correspond to 8-bit gray scale and are created according to rules for outputting a black dot when the pixel value of a pixel in the input image is equal to or less than the threshold value in the threshold matrix. The size of the threshold matrices is arbitrary, however, using a square shape that has lengths that are exponents of 2 (for example 256×256) is preferred. In this embodiment, the threshold matrices are constructed starting from bright tone levels and go toward darker tone levels.

In the following, the method for creating threshold matrices according to the seventh embodiment will be described. The halftone processing unit 106, in step S2902, sets an allowable value for the amount of degradation of the graininess evaluation value when a position shift occurs. In step S2903, coefficient α is set to 0, and coefficient β is set to 1. Here, α+0=1, and α takes on a value within the specified range of 0 to 1. In step S2904, the halftone processing unit 106 creates a dot pattern for all tone levels when coefficient α=0, and coefficient β=1.

Next, the processing of step S2904 is performed according to the processing flow illustrated in FIG. 30. First, the halftone processing unit 106 performs the initial processing of steps S3002 to S3006 that is the same as the processing from steps S1502 to S1506 in FIG. 15. Next, the halftone processing unit 106 performs the processing of steps S3007 to S3010 that is similar to the processing of steps S1507 to S1510 in FIG. 15. In steps S3007 to S3010, processing differs from the processing contents of steps S1507 to S1510 only in that the range for repeating the threshold value g is 253 to 1.

At the instant that the processing in FIG. 30 ends, a dot pattern for all tone levels has been created for $\alpha=0$ and $0=1$. Processing then proceeds to step S2905 in FIG. 29, and this dot pattern is temporarily taken to be the most suitable pattern. In the processing after this, the halftone processing unit 106 changes the coefficients $\alpha$ and $\beta$ one fixed size at a time and creates a new dot pattern, then evaluates the graininess and updates the most suitable pattern according to the evaluation results.

In other words, processing advances to step S2906, and sets an increment width $\Delta\alpha$ for coefficient $\alpha$. The range for coefficient $\alpha$ is 0 to 1, so the value of the increment width $\Delta\alpha$ is preferably 0.5 or less. Next, in step S2907, coefficient $\alpha$ is set to $\Delta\alpha$, and in step S2908 according to the processing flow illustrated in FIG. 30, a dot pattern is created for all tone levels for the coefficient. The graininess is then evaluated in step S2909 for the obtained dot pattern for when there is no position shift, and in step S2910 the graininess is evaluated for when there is a position shift. As a method for evaluating graininess, a method that uses RMS granularity, and a method that uses Fast Fourier Transformation (FFT) and a VTF filter are known, and the later method will be used here.

Figure 31:
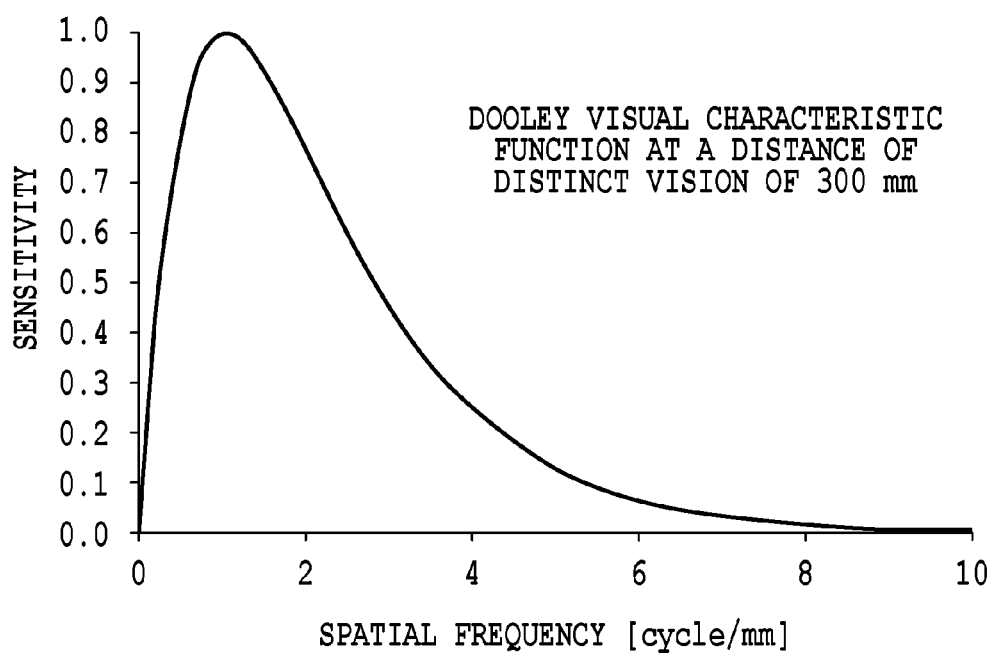
FIG. 31 is a characteristic diagram that illustrates the Dooley VTF (Visual Transfer Function)

More specifically, first, in the evaluation of graininess when there is no position shift (S2909), an image is created by overlapping pattern A and pattern B without a position shift. This image is created such that pixels for which there is a dot in either pattern A or pattern B is taken to be black (for example, 0 in the case of 8-bit format), and pixels for which there is no dot in either pattern are taken to be white (255 in the case of 8-bit format). The image that is created in this way is then converted to a spatial frequency component by FFT processing in order to evaluate the graininess. A VTF (Visual Transfer Function) function by Dooley as illustrated in FIG. 31 is known as a frequency characteristic that is visible by the human eye. The response of the VTF function is sensitive in low-frequency areas, and is insensitive in high-frequency areas. In other words, this means that large obvious unevenness that spreads spatially can be detected by the human eye, but that fine unevenness cannot be detected. Therefore, the high-frequency component that cannot be detected by the human eye is cut by using the VTF function as a filter, and the integral of the frequency component after the high-frequency component has been cut is taken to be the graininess evaluation value when there is no position shift.

In evaluation of the graininess when there is a position shift (step S2910), the halftone processing unit 106 shifts pattern B two pixels in the conveyance direction of the paper and creates an overlapped image with pattern A. The amount that pattern B is shifted can be changed according to the amount of shifting during actual printing. Moreover, when it is presumed that there will be shifting in a direction other than the conveyance direction of the paper, the graininess can be evaluated for when there is a position shift in that direction. The graininess evaluation value for when there is a position shift can be calculated and obtained by using FFT processing and a VTF filter for the overlapped image that has been shifted in the same way as done in the case of the image for which there was no position shift of pattern A and pattern B.

Next, in step S2911, the halftone processing unit 106, based on the graininess evaluation results for when there is no position shift and when there is position shift, determines for each tone level whether the graininess degradation value is within the range of allowable values that was set in step S2902. The graininess degradation value is calculated as the value when the (graininess evaluation value when there is no position) shift) was reduced from the (graininess evaluation value when there was a position shift). When graininess evaluation values that correspond to plural shifting are calculated in step S2910, graininess degradation values 1, 2, ... that correspond to each shift are calculated. Preferably, the graininess evaluation values are calculated for dot patterns of plural tone levels for all tone levels, however, when only the graininess degradation for part of the tone levels is seen as a problem, it is also possible to calculate graininess evaluation values for just those tone levels. When evaluating graininess for part of the tone levels, preferably evaluation is performed for tone levels having a higher lightness that are easily detected by the human eye.

In the judgment process of step S2911, when it is determined that the graininess evaluation value exceeds the allowable range, processing moves to step S2915, and after updating the coefficients $\alpha$ and $\beta$, processing returns to step S2908, and patterns A and B are created again. In the judgment process of step S2911, determining that the graininess evaluation value is within the allowable range means that when determining whether or not the graininess degradation value for all tone levels is within the allowable range, all of the judgment results were affirmative. When the judgment result for just one tone level is determined to be negative, it is determined that the graininess evaluation value is not within the allowable range. On the other hand, when it is determined that the graininess evaluation value is within the allowable range, processing moves to step S2912, and it is determined whether the graininess evaluation value for when there is no position shift is better than that of the temporary optimum pattern. When it is determined that the graininess evaluation value is not better, processing is performed from step S2915 on. When it is determined that the graininess evaluation value is better, processing moves to step S2913, and the halftone processing unit 106 performs an update so that the current dot pattern B is the new temporary optimum pattern. Next, according to the judgment process of step 2914, by repeating this series of process (step S2908 to S2913, and S2915) until the coefficient $\alpha$ becomes 1, it is possible to obtain a pattern for which the graininess evaluation value is within the allowable range, and that has the best graininess. Finally, in step S2916, the halftone processing unit 106 takes the most recent dot pattern that was updated to be the temporary optimum pattern to be the optimum dot pattern, and creates corresponding MatrixA and MatrixB as the final threshold matrices.

Variation for Setting the Allowable Value for Graininess Degradation

Figure 32:
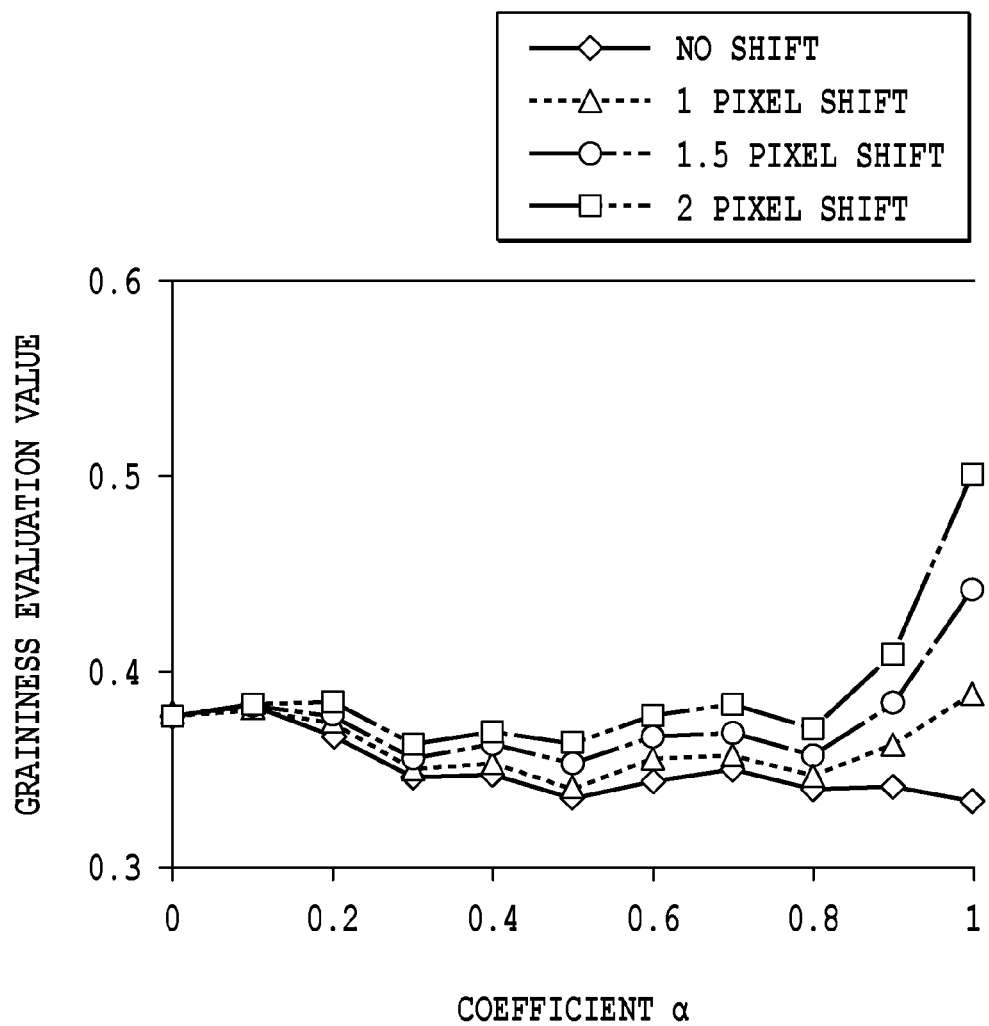
FIG. 32 is a characteristic diagram that illustrates the graininess evaluation value that corresponds to the amount of position shift in a seventh embodiment.

FIG. 32 illustrates graininess evaluation values for each of the cases when there is no shifting, the shifting amount is 1 pixel, the shifting amount is 1.5 pixels, and the shifting amount is 2 pixels. As can be seen from FIG. 32, as the amount of shifting becomes larger, the degree of graininess degradation becomes greater. Therefore, the allowable value for the graininess degradation that is set in step S2902 can be changed according to the estimated amount of shifting. For example, by setting the allowable value for the graininess degradation to a small value when it is estimated that the amount of shifting will not be so large (in other words, so that more graininess degradation is not allowed), it is possible to obtain threshold matrices that have more robust graininess.

Changing Coefficients $\alpha$ and $\beta$ According to the Tone Level

Figure 33:
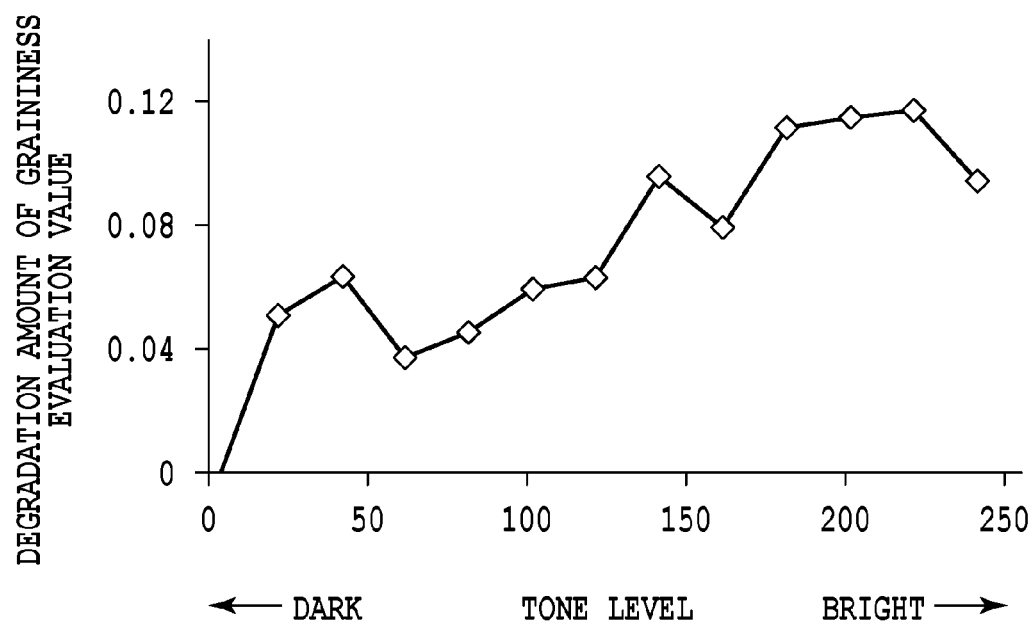
FIG. 33 is a characteristic diagram that illustrates the degradation in graininess for each tone level when creating dot patterns for all tone levels using set coefficients.

In the method described above, constant value coefficients $\alpha$ and $\beta$ were used for all tone levels when creating threshold matrices. FIG. 33 illustrates a graininess degradation value for each tone level ((graininess evaluation value when there is shifting of two pixels)−(graininess evaluation value when there is no shifting)) when creating dot patterns for all tone levels for constant coefficients ($\alpha$=0.9, $\beta$=0.1). As can be seen from FIG. 33, when the coefficients $\alpha$ and $\beta$ are constant for all tone levels, the degree of graininess degradation differs for each tone level. In the method described above, coefficients $\alpha$ and $\beta$ are set so that the maximum graininess degradation value (near tone level 230 in FIG. 33) becomes less than or equal to the allowable value. However, in this method, at a tone level for which the graininess degradation value is small (for example, near tone level 60 in FIG. 33), the pattern excessively suppresses graininess degradation, and due to the trade off relationship described above (see FIG. 28), graininess when there is no position shift may be sacrificed. Therefore, the entire tone level range can be divided starting from the bright tone levels into a first tone level area, a second tone level area, . . . , kth tone level area, and the coefficients $\alpha$ and $\beta$ can be changed to different values for each tone level area.

In this case as well, creation is performed from patterns for bright tone levels according to the processing flow described above. However, in order to optimize the coefficients $\alpha$ and $\beta$ for each tone level area, the range of tone level g in steps S3007 to S3010 in the processing of the flowchart in FIG. 30 is changed to the range of the target tone level area. More specifically, first, in the range of the first tone level area, the dot patterns are optimized by changing the coefficients $\alpha$ and $\beta$ from 0 to 1 (where, $\alpha+\beta=1$). After the optimum dot patterns are set for the first tone level area, the dot pattern for the darkest tone level of the first tone level area is taken to be the initial arrangement in step S3003, and the dot patterns for the range of the second tone level area are optimized by similarly changing the coefficients $\alpha$ and $\beta$. When doing this, naturally it is not necessary for the values of the coefficients $\alpha$ and $\beta$ for the optimum dot patterns of the first tone level area and second tone level area to be the same. By performing this process up to the kth tone level area, it is possible to create optimum dot patterns for all tone levels.

The allowable value for graininess degradation can also be set to different values for each tone level area.

Changing the Coefficients $\alpha$ and $\beta$ According to the Dot Size

In an image formation apparatus that can form dots having various different sizes, tone level is expressed by changing the amount of ink ejection for one drop for each tone level.

Figure 34A:
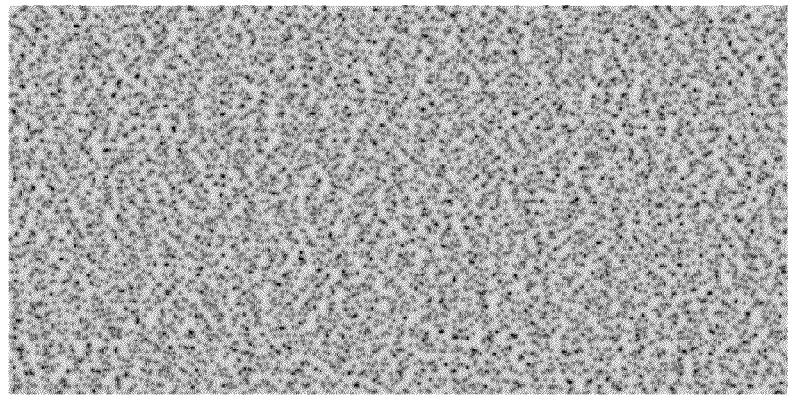
FIGS. 34A to 34C are drawings that illustrate the formed image using the same dot pattern with ink drops of different sizes.
Figure 34B:
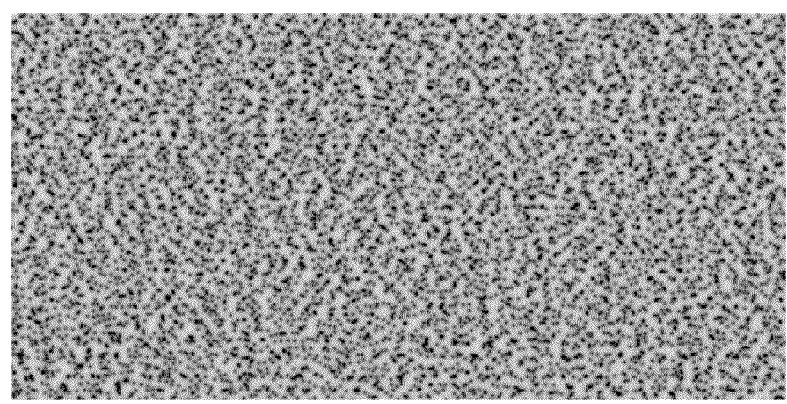
Figure 34C:
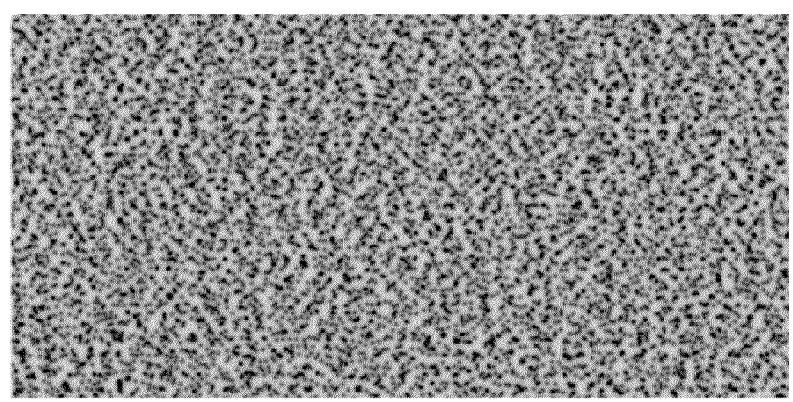

FIGS. 34A to 34C illustrate images for the cases in which the same dot pattern is formed by changing the amount of ink ejection in three stages. FIG. 34A illustrates the case in which the amount of ink ejection for one drop is small, FIG. 34B illustrates the case for a middle amount, and FIG. 34C illustrates the case for a large amount. The dot pattern is the same, so the distribution of sparse and dense dots of the dot pattern is the same, however, as the dots become larger, the contrast between areas where the dots are dense and areas where the dots are sparse becomes more intense, and in FIG. 34C it can be seen that the graininess has degraded.

Figure 35:
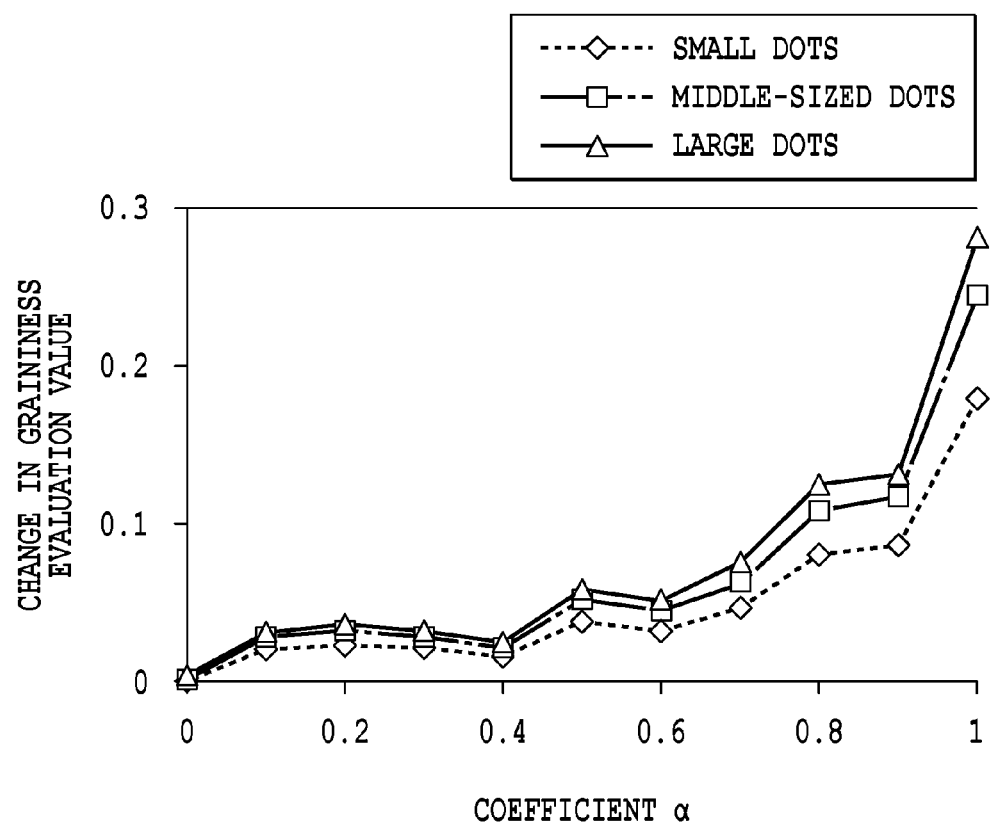
FIG. 35 is a characteristic diagram that compares and illustrates the amount of degradation in the graininess evaluation value for each image formation by ink drops having different sizes.

FIG. 35 compares the amount of degradation of the graininess evaluation value for the case in which an image was formed by changing the size of the dots (in other words, size of the ink drops) in three stages for the dot patterns created by changing the coefficient $\alpha$ from 0 to 1 (where, $\beta=1-\alpha$). From FIG. 35 it can be seen that as the dots become larger, the degradation amount of the graininess evaluation value increases. For example, when the allowable value for graininess degradation is set to 0.1, for small dots the dot pattern for $\alpha$=0.8 and the dot pattern for $\alpha$=0.9 satisfy the allowed value, however, for middle-sized and large dots, the dot patterns when $\alpha$ is equal to or greater than 0.8 do not satisfy the allowable value. In order to create an optimum dot pattern according to the size of the dots, this characteristic can be taken into consideration, and the coefficients $\alpha$ and $\beta$ can be changed for each tone level area having different dot sizes.

For example, when creating dot patterns in the first tone level area with small dots, in the second tone level area with middle-sized dots, and in the third tone level area with large dots, it is possible to create optimum dot patterns by changing the coefficients $\alpha$ and $\beta$ in the range 0 to 1 for each tone level area by the same processing flow as described above.

Characteristics Related to Shifting in Created Dot Patterns

Figure 36:
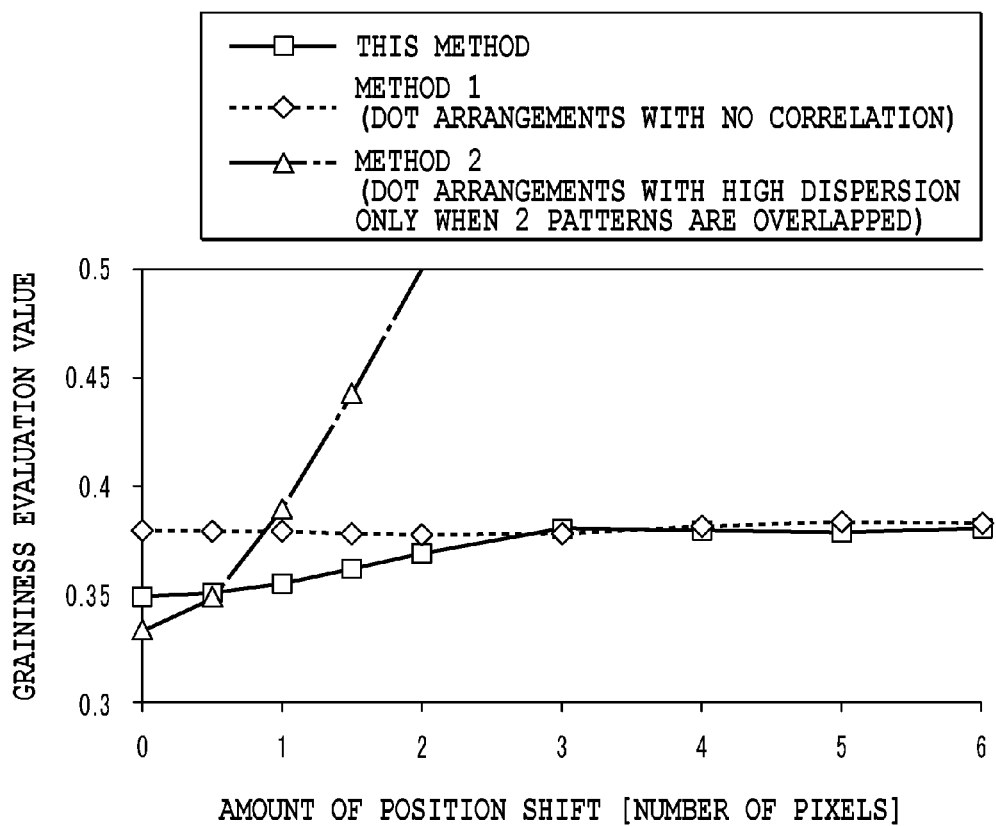
FIG. 36 is a characteristic diagram that illustrates the change in the graininess evaluation value with respect to the amount of phase shift for a dot pattern that is created by the method of a seventh embodiment.

FIG. 36 compares the change in the graininess evaluation value with respect to the amount of position shift in the dot patterns created by this method with the change in the graininess evaluation value of dot patterns that were created by the other two methods.

Method 1 is for dot patterns having high dispersion that were created with no correlation with each other (FIG. 10). This arrangement can be created by setting the coefficients of the potential evaluation equation of this embodiment to be $\alpha$=0 and $\beta$=1. The dot patterns in method 1 are created with no correlation to each other, so even when the amount of shifting changes, the graininess evaluation value is nearly constant.

Method 2 creates two dot patterns by dividing a dot pattern having high dispersion. For example, as in the example of divisions illustrated in FIG. 26B and FIG. 26C, one dot pattern is divided into odd rows and even rows. This arrangement can be created by setting the coefficients of the potential evaluation equation of this embodiment to be $\alpha$=1 and $\beta$=0. Method 2, opposite from method 1, has dot patterns that are highly correlated with each other. These dot patterns are such that the graininess becomes good when the two dot patterns overlap with no position shift. However, individual dot patterns have blank white areas in which the dispersion is low, so as the amount of position shift increases, the blank white areas become apparent and the graininess evaluation value degrades.

On the other hand, the method of the seventh embodiment (when coefficients $\alpha$ and $\beta$>0) has the characteristic that differs from the two methods above in how the graininess with respect to the amount of position shifting changes. This method has the characteristic in that the dot patterns are not correlated with each other, so up to a specified amount of position shift (three pixels), the graininess evaluation value incrementally degrades, and the dispersion of individual dot patterns is high, so in the range where the amount of position shift exceeds the specified amount, the graininess evaluation value is nearly constant.

Varied Embodiments

Correction of the Unit Potential Shape According to Tone Level

In the embodiments described above, the basic shape (width) of the unit potentials when creating threshold matrices was constant for all tone levels. However, it is also possible to change the shape of the unit potentials according to the tone level value, or in other words, according to the percentage of black dots with respect to the entire image.

Variation of Dot Correction

In the correction of the dot arrangements described above, correction was equally performed in an alternating manner for matrixA and matrixB, however, it is also possible to perform correction for just one of the matrices and to not perform correction for the other. For example, a form is possible in which a threshold matrix that is considered to be sufficiently good is prepared for matrixA, and then a corresponding matrixB is created while referencing matrixA.

Application to Nozzle Groups that Include Nozzles Having Different Diameters, Different Densities and Different Colors In the explanation of the embodiments described above, it was presumed that nozzle groups ejected ink having the same color (K) and same diameter in the same main scanning recording area of a specified recording medium. However, it is also possible to include nozzle groups that eject ink of the same color but different diameters, or nozzle groups that eject ink having different densities, or different colors in the nozzle groups to which the threshold matrices of the present invention are applied. In that case, as in the embodiments described above, the set of created threshold matrices can be adapted to the inputted image, and the outputted dot arrangements can be assigned as dot arrangements created by each nozzle group.

Changes in the Conditions in the Vertical Direction and Horizontal Direction of the Dot Patterns According to the Resolution in the Main-Scanning Direction, and the Interlace Method Furthermore, in the embodiments described above, the vertical and horizontal axes of the dot patterns were handled under equal conditions without being particularly classified, however, this does not necessarily need to be so. For example, it is possible to make the conditions different for the vertical and horizontal directions of the dot patterns by taking into consideration differences in resolution in the main-scanning direction and sub-scanning direction of the image processing apparatus, or the image formation method, which is called the interlace method. In order for this, known design methods such as making the shapes of the potentials asymmetric, or providing prohibitions for every other row that corresponds to the interlacing of the dot arrangements. When there is overlapping of part of the dots, it is possible to embody the present invention by changing part of the conditions in this way.

Combination with Conventional Path Separation

Moreover, in conventional technology, there were many examples in which the dot arrangements that are formed by the nozzle groups were achieved by separating and assigning the results of halftone processing for each of the nozzle groups (path separation). The method of each of the embodiments of the present invention can also be embodied together with that technology. As an example, at a certain time, the first through fourth nozzle groups can be such that threshold matrix A is a dot arrangement that is formed by overlapping by the first nozzle group and the second nozzle group, and the dot arrangements of the first nozzle group and the second nozzle group can be created with conventional path separation using threshold matrix A. The dot arrangements by the third and fourth nozzle groups can be created in the same way with conventional path separation using threshold matrix B.

Other Variations

In the embodiments, a method for creating threshold matrices for all tone levels was explained, however, it is also possible to create threshold matrices for a specific tone level.

Furthermore, it is also possible to perform dot arrangements by a method that instead of threshold matrices, can be used together with error diffusion, even for dot arrangements for each tone level. In other words, there is a so-called halftone method in which binary dot arrangements corresponding to the number of necessary tone level values are stored instead of threshold matrices, and tone level values that correspond to the input pixels and the position results are outputted, however, it is also possible to use those methods for creating a set of dot arrangements. In that case, differing from the case of using threshold matrices, it is possible to set dot arrangements without taking into consideration the black dots that are set for the previous tone level.

Moreover, as was particularly made clear in the second embodiment, dot patterns that have a phase difference characteristic of being in the same phase in continuous sections in a middle frequency area can be achieved without using a method for creating dot patterns such as threshold matrices in advance. For example, it is also possible to achieve the dot patterns by a method of adaptively setting dot patterns for the input image while referencing a dot pattern that has already been set. The present invention can also be used for this kind of method for adaptively setting the dot arrangements.

Moreover, in the embodiments described above, a method of performing a processing loop was explained in which specified judgment was performed for the dot patterns obtained in step S1512, and the unit potentials were changed until conditions were satisfied. However, the embodiments are not limited to this. For example, it is also possible to create dot patterns in advance based on plural unit potentials, then performing judgment and selecting the most suitable unit potentials when there are unit potentials that satisfy conditions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077884, filed Apr. 4, 2014, which is hereby incorporated by reference wherein in its entirety.

What is claimed is:

1. A computerized method for creating threshold matrices having a predetermined size, performed by an image processing apparatus, including a processor connected to a memory and configured to execute the method, the method comprising:

receiving a first image data indicating a first dot arrangement, a second image data indicating a second dot arrangement, the first image data and the second image data having the same size as the size of the threshold matrices, a predetermined first weighting map, and a predetermined second weighting map, the first and second weighting maps provided by adding weighting values based on respective first and second weighting functions to a pixel where a dot is formed and to pixels surrounding that pixel in the first image data and the second image data, respectively;

generating the first dot arrangement comprising of a predetermined number of dots by determining positions where the predetermined number of dots are to be added to the first image data based on an evaluation equation using the first and second weighting maps, adding the dots to the determined positions, and, every time the predetermined number of dots are added, updating the first weighting map based on the pixel positions where the dots are added and the first weighting function;

generating the second dot arrangement comprising of the predetermined number of dots by determining pixel positions where the predetermined number of dots are to be added to the second image data based on the evaluation equation using the first and second weighting maps, adding the dots to the determined pixel positions, and, every time the predetermined number of dots are added, updating the second weighting map based on the pixel positions where the dots are added and the second weighting function;

alternately and repeatedly generating the first dot arrangement comprising of the predetermined number of dots and the second dot arrangement comprising of the predetermined number of dots until the number of dots in each of the first dot arrangement and the second dot arrangement reaches a target dot number;

evaluating image quality of a dot pattern that is obtained by overlapping the first dot arrangement and the second dot arrangement, wherein each of the first and the second dot arrangements include at least the target dot number of dots, by calculating frequency analysis;

changing at least one of the first and second weighting functions or the evaluation equation in case where the evaluation results in the evaluating do not satisfy a predetermined condition;

repeating the generating and evaluating, based on the changed first and second weighting functions until the first and second dot arrangements that satisfy the predetermined condition are obtained; and creating first and second threshold matrixes based on an order in which the dots are added to each of the first and second dot arrangements that satisfy the predetermined condition.

2. The computerized method for creating threshold matrices according to claim 1, wherein the evaluating comprises:

calculating frequency characteristics for the phase difference between the first dot arrangement and the second dot arrangement; and determining, in a case where the phase difference is reverse phase in a low frequency, whether the change of the image quality of the dot pattern that is obtained by overlapping the first dot arrangement and the second dot arrangement when there is a position shift with respect to when there is no position shift is within the specified range.

3. The computerized method for creating threshold matrices according to claim 1, wherein the evaluating comprises:

calculating frequency characteristics for the phase difference between the first dot arrangement and the second dot arrangement; and determining, in a case where the phase difference is reverse phase at a low frequency, or the phase difference is in phase at a middle frequency that is higher than the low frequency, or the phase difference is reverse phase at a high frequency that is higher than the middle frequency, whether the change in image quality of the dot pattern that is obtained by overlapping the first dot arrangement and the second dot arrangement when there is a position shift with respect to when there is no position shift is within the specified range.

4. The computerized method for creating threshold matrices according to claim 1, wherein the weighting functions are functions which spread two-dimensionally and which give weighting larger than zero to a center pixel and pixels surrounding the center pixel; and wherein the updating step comprises the step of:

changing the value of the centers of the weighting functions by updating the height of the weighting functions.

5. The computerized method for creating threshold matrices according to claim 1, wherein the evaluating comprises:

calculating the degree of overlapping of dots in the dot pattern that is obtained by overlapping the first dot arrangement and the second dot arrangement when there is a position shift.

6. The computerized method for creating threshold matrices according to claim 1, wherein the evaluating comprises:

evaluating a degradation value of graininess when the first dot arrangement and the second dot arrangement are overlapped with a position shift with respect to when the first dot arrangement and the second dot arrangement are overlapped with no position shift.

7. The computerized method for creating threshold matrices according to claim 1, wherein the change in the image quality due to position shift that occurred in case where overlapping the first dot arrangement and the second dot arrangement is such that the image quality incrementally degrades with respect to the amount of shifting when shifting is within a specified range, and such that the image quality is nearly constant with respect to the amount of shifting when shifting exceeds the specified range.

8. An image processing apparatus comprising:

a reception unit configured to receive a first image data indicating a first dot arrangement, a second image data indicating a second dot arrangement, the first image data and the second image data having the same size as the size of the threshold matrices, a predetermined first weighting map, and a predetermined second weighting map, the first and second weighting maps provided by adding weighting values based on respective first and second weighting functions to a pixel where a dot is formed and to pixels surrounding that pixel in the first image data and the second image data, respectively;

a first dot arrangement generation unit configured to generate the first dot arrangement comprising of a predetermined number of dots by determining positions where the predetermined number of dots are to be added to the first image data based on an evaluation equation using the first and second weighting maps, adding the dots to the determined positions, and every time the predetermined number of dots are added, updating the first weighting map based on the pixel positions where the dots are added and the first weighting function;

a second dot arrangement generation unit configured to generate the second dot arrangement comprising of the predetermined number of dots by determining pixel positions where the predetermined number of dots are to be added to the second image data based on the evaluation equation using the first and second weighting maps, adding the dots to the determined pixel positions, and every time the predetermined number of dots are added, updating the second weighting map based on the pixel positions where the dots are added and the second weighting function;

a generation unit configured to generate alternately and repeatedly the first dot arrangement comprising of the predetermined number of dots and the second dot arrangement comprising of the predetermined number of dots until the number of dots in each of the first dot arrangement and the second dot arrangement reaches a target dot number;

an evaluation unit configured to evaluate image quality of a dot pattern that is obtained by overlapping the first dot arrangement and the second dot arrangement, wherein each of first and second dot arrangements are comprised of at least the target dot number of dots, by calculating frequency analysis;

a change unit configured to change at least one of the first and second weighting functions or the evaluation equation in a case where the evaluation results by the evaluation unit do not satisfy a predetermined condition;

a control unit configured to control the generation unit and the evaluation unit to alternately and repeatedly generate the first dot arrangement and the second dot arrangement, based on the changed first and second weighting functions, until the first and second dot arrangements that satisfy the predetermined condition are obtained; and a creation unit configured to create a first threshold matrix and a second threshold matrix based on an order in which dots are added to each of the first and second dot arrangements that satisfy the predetermined condition.

9. A non-transitory computer-readable storage medium that stores a program for causing a computer to perform a method for creating threshold matrices the method comprising the steps of:

receiving a first image data indicating a first dot arrangement, a second image data indicating a second dot arrangement, the first image data and the second image data having the same size as the size of the threshold matrices, a predetermined first weighting map, and a predetermined second weighting map, the first and second weighting maps provided by adding weighting values based on respective first and second weighting functions to a pixel where a dot is formed and to pixels surrounding that pixel in the first image data and the second image data, respectively;

generating the first dot arrangement comprising of a predetermined number of dots by determining positions where the predetermined number of dots are to be added to the first image data based on an evaluation equation using the first and second weighting maps, adding the dots to the determined positions, and, every time the predetermined number of dots are added, updating the first weighting map based on the pixel positions where the dots are added and the first weighting function;

generating the second dot arrangement comprising of the predetermined number of dots by determining pixel positions where the predetermined number of dots are to be added to the second image data based on the evaluation equation using the first and second weighting maps, adding the dots to the determined pixel positions, and, every time the predetermined number of dots are added, updating the second weighting map based on the pixel positions where the dots are added and the second weighting function;

alternately and repeatedly generating the first dot arrangement comprising of the predetermined number of dots and the second dot arrangement comprising of the predetermined number of dots until the number of dots in each of the first dot arrangement and the second dot arrangement reaches a target dot number;

evaluating image quality of a dot pattern that is obtained by overlapping the first dot arrangement and the second dot arrangement, wherein each of the first and the second dot arrangements include at least the target dot number of dots, by calculating frequency analysis;

changing at least one of the first and second weighting functions or the evaluation equation in case where the evaluation results in the evaluating step do not satisfy a predetermined condition;

repeating the generating and evaluating steps, based on the changed first and second weighting functions until the first and second dot arrangements that satisfy the predetermined condition are obtained; and creating first and second threshold matrixes based on an order in which the dots are added to each of the first and second dot arrangements that satisfy the predetermined condition.

* * * * *